United States Patent
Abouelseoud et al.

(10) Patent No.: US 10,813,041 B2
(45) Date of Patent: Oct. 20, 2020

(54) PROPAGATING DISCOVERY ASSISTANCE REQUEST AND RESPONSE

(71) Applicant: SONY CORPORATION, Tokyo (JP)

(72) Inventors: Mohamed Abouelseoud, San Francisco, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/274,878

(22) Filed: Feb. 13, 2019

(65) Prior Publication Data
US 2020/0154347 A1   May 14, 2020

Related U.S. Application Data

(60) Provisional application No. 62/757,994, filed on Nov. 9, 2018.

(51) Int. Cl.
*H04W 48/16* (2009.01)
*H04W 48/10* (2009.01)
(Continued)

(52) U.S. Cl.
CPC .......... *H04W 48/16* (2013.01); *H04B 7/0617* (2013.01); *H04B 7/0695* (2013.01); *H04W 16/28* (2013.01); *H04W 48/10* (2013.01); *H04W 72/0446* (2013.01); *H04B 7/0413* (2013.01); *H04W 84/18* (2013.01)

(58) Field of Classification Search
CPC ..... H04W 8/005; H04W 48/08; H04W 84/12; H04W 88/06
See application file for complete search history.

(56) References Cited

U.S. PATENT DOCUMENTS

| 10,164,697 B2 * | 12/2018 | Aryafar ............... H04B 7/0617 |
| 2009/0318138 A1 | 12/2009 | Zeng |
| 2019/0082379 A1 | 3/2019 | Abouelseoud |

FOREIGN PATENT DOCUMENTS

| WO | 2014014990 A1 | 1/2014 |
| WO | 2014124048 | 8/2014 |

(Continued)

OTHER PUBLICATIONS

ISA/EPO, International Search Report and Written Opinion dated Jan. 9, 2020, related PCT international application No. PCT/IB2019/058449, pp. 1-12, claims searched, pp. 13-19.
(Continued)

*Primary Examiner* — Chandrahas B Patel
(74) *Attorney, Agent, or Firm* — O'Banion & Ritchy LLP; John P. O'Banion

(57) ABSTRACT

A wireless communication apparatus/system/method utilizing directional data transmission over a communication (e.g., mmW) band and propagating discovery assistance request and responses to neighboring stations (e.g., in its BSS or in the surrounding area) toward increasing network efficiency. If these stations support discovery assistance they send a discovery assistance response to the station from which the request was propagated. The STA that sent the propagated discovery assistance request processes all the responses and sends a discovery assistance response, containing information about the discovery assistance campaign, to the STA that requested the discovery assistance request.

20 Claims, 22 Drawing Sheets

| Element ID | Length | Element ID Extension | Discovery Assistance Control | BTI | Beamforming Start TSF | Discovery Assistance Window Length | Dwelling Time | Temporary AID |
|---|---|---|---|---|---|---|---|---|
| Octets: 1 | 1 | 1 | 3 | 1 | 4 | 2 | 2 | 1 |

_— 330

(51) Int. Cl.
*H04W 16/28* (2009.01)
*H04B 7/06* (2006.01)
*H04W 72/04* (2009.01)
*H04B 7/0413* (2017.01)
*H04W 84/18* (2009.01)

(56) References Cited

FOREIGN PATENT DOCUMENTS

| WO | 2014124251 | 8/2014 |
|----|------------|--------|
| WO | 2015134746 | 9/2015 |
| WO | 2017027869 | 2/2017 |

OTHER PUBLICATIONS

IEEE, Working Group of the LAN/MAN Standards Committee of the IEEE Computer Society, P802.11ay/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Oct. 2018, part 1 of 7.

IEEE, Working Group of the LAN/MAN Standards Committee of the IEEE Computer Society, P802.11ay/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Oct. 2018, part 2 of 7.

IEEE, Working Group of the LAN/MAN Standards Committee of the IEEE Computer Society, P802.11ay/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Oct. 2018, part 3 of 7.

IEEE, Working Group of the LAN/MAN Standards Committee of the IEEE Computer Society, P802.11ay/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Oct. 2018, part 4 of 7.

IEEE, Working Group of the LAN/MAN Standards Committee of the IEEE Computer Society, P802.11ay/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Oct. 2018, part 5 of 7.

IEEE, Working Group of the LAN/MAN Standards Committee of the IEEE Computer Society, P802.11ay/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Oct. 2018, part 6 of 7.

IEEE, Working Group of the LAN/MAN Standards Committee of the IEEE Computer Society, P802.11ay/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Oct. 2018, part 7 of 7.

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| 2 | 2 | 6 | 6 | 3 | 3 | 4 |

Octets:

FIG. 7 (Prior Art)

| B0 | B1  B9 | B10  B15 | B16  B17 | B18  B23 |
|---|---|---|---|---|
| Direction | CDOWN | Sector ID | DMG Antenna ID | RXSS Length |
| 1 | 9 | 6 | 2 | 6 |

Bits:

FIG. 8 (Prior Art)

| B0  B8 | B9  B10 | B11  B15 | B16 | B17  B23 |
|---|---|---|---|---|
| Total sectors in ISS | Number of RX DMG antennas | Reserved | Poll Required | Reserved |
| 9 | 2 | 5 | 1 | 7 |

Bits:

FIG. 9A (Prior Art)

| B0  B5 | B6  B7 | B8  B15 | B16 | B17  B23 |
|---|---|---|---|---|
| Sector select | DMG Antenna select | SNR report | Poll Required | Reserved |
| 6 | 2 | 8 | 1 | 7 |

Bits:

FIG. 9B (Prior Art)

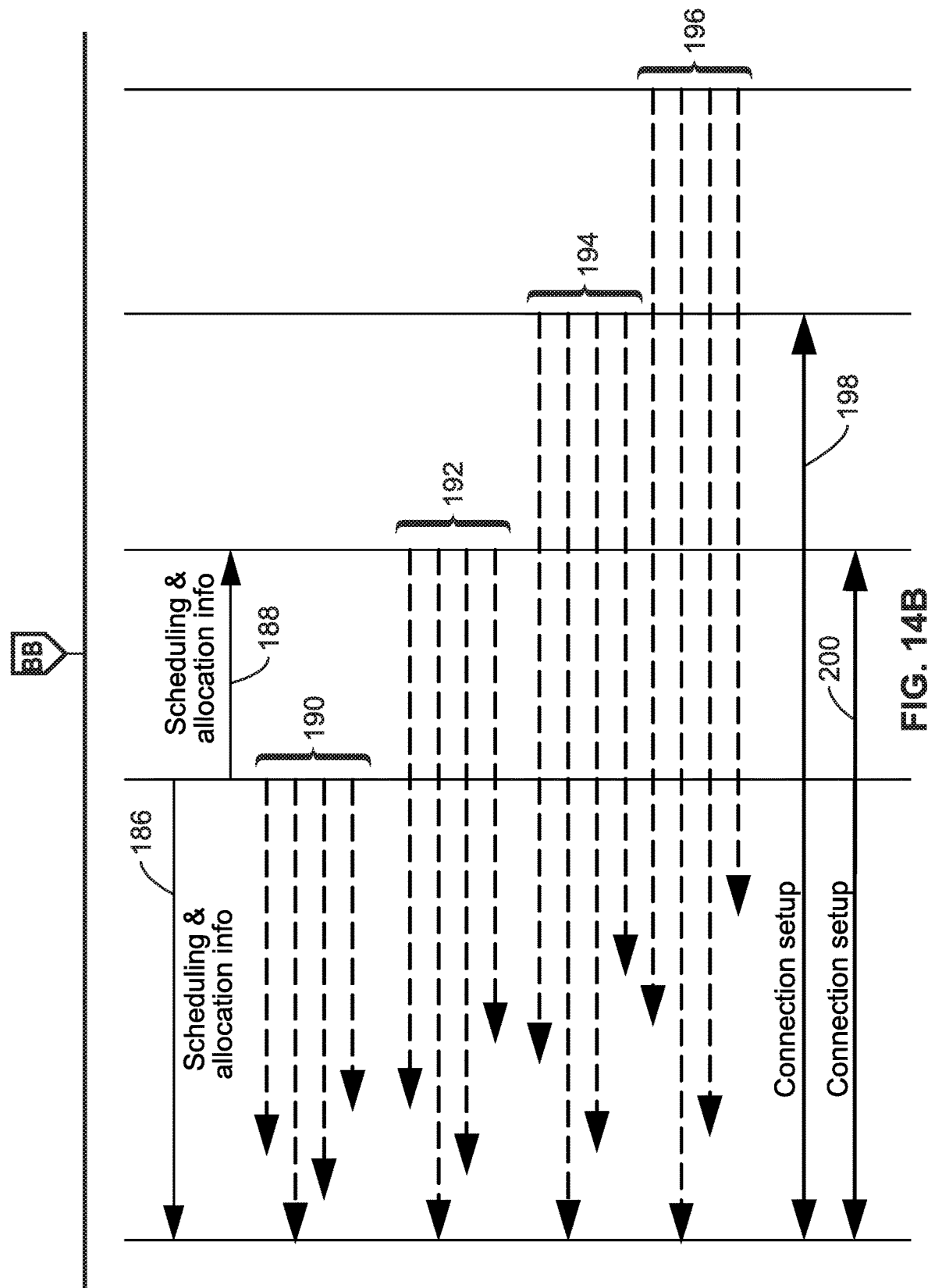

FIG. 18

| Element ID | Length | Element ID Extension | Discovery Assistance Control | BTI | Beamforming Start TSF | Discovery Assistance Window Length | Dwelling Time | Temporary AID |
|---|---|---|---|---|---|---|---|---|
| 1 | 1 | 1 | 3 | 1 | 4 | 2 | 2 | 1 |

Octets:

| Request /response Indication | Discovery Assistance Type | Discovery Assistance Request status code | Time Unit | Beamforming Period (BIs) | Fragmented TXSS | TXSS Span | Reserved |
|---|---|---|---|---|---|---|---|
| 1 | 1 | 2 | 4 | 4 | 1 | 7 | 4 |

Bits

| Element ID | Length | Allocation 1 | Allocation 2 | ... | Allocation n |
|---|---|---|---|---|---|
| 1 | 1 | 15 | 15 | ... | 15 |

Octets:

| Allocation Control | BF Control | Source AID | Destination AID | Allocation Start | Allocation Block Duration | Number of Blocks | Allocation Block Period |
|---|---|---|---|---|---|---|---|
| 2 | 2 | 1 | 1 | 4 | 2 | 1 | 2 |

Octets:

FIG. 22 — 370

| B0 B3 | B4 B6 | B7 | B8 | B9 | B10 | B11 | B13 B15 |
|---|---|---|---|---|---|---|---|
| Allocation ID | Allocation Type | Pseudo-static | Truncatable | Extendable | PCP Active | LP SC Used | Reserved |
| 4 | 3 | 1 | 1 | 1 | 1 | 1 | 4 |

Bits:

FIG. 23 — 380

| Element ID | Length | STA Address | AID | DMG STA Capability Information | DMG AP OR PCP Capability Information | DMG STA Beam Tracking TimeLimit | Extended SC MCS Capabilities | Maximum Number of Basic A-MSDU Subframes in A-MSDU | Maximum Number of Short A-MSDU Subframes in A-MSDU |
|---|---|---|---|---|---|---|---|---|---|
| 1 | 1 | 6 | 1 | 8 | 2 | 2 | 1 | 1 | 1 |

Octets:

390

| B0 | B1 | B2 | B3 | B4 B5 | B6 | B7 B13 |
|---|---|---|---|---|---|---|
| Reverse Direction | High Layer Timer Synchronization | TPC | SPSH and Interference Mitigation | Number of RX DMG Antennas | Fast Link Adaptation | Total Number of Sectors |
| Bit: 1 | 1 | 1 | 1 | 2 | 1 | 7 |

| B14 B19 | B20 | B21 B26 | B27 | B28 B51 | B52 |
|---|---|---|---|---|---|
| RXSS Length | DMG Antenna Reciprocity | A-MPDU Parameters | BA with Flow Control | Supported MCS Set | DTP Supported |
| Bit: 6 | 1 | 6 | 1 | 24 | 1 |

| B53 | B54 | B55 | B56 | B57 B59 | B60 | B61 | B62 | B63 |
|---|---|---|---|---|---|---|---|---|
| A-PPDU Supported | Heartbeat | Supports Other_AID | Antenna Pattern Reciprocity | Heartbeat Elapsed Indication | Grant ACK Supported | RXSSTxR ATE Supported | Discovery assistance Supported | Reserved |
| Bit: 1 | 1 | 1 | 1 | 3 | 1 | 1 | 1 | 1 |

FIG. 24

| Category | DMG Action | Subject address | Request element | Zero or more DMG Capabilities elements | Zero or more Provided Elements | Zero or more Extended Request elements |

FIG. 25 (400)

| Category | DMG Action | Subject address | Zero or more DMG Capabilities elements | Zero or more requested elements | Zero or more provided Request elements |

FIG. 26 (410)

PROPAGATING DISCOVERY ASSISTANCE REQUEST AND RESPONSE

CROSS-REFERENCE TO RELATED APPLICATIONS

This application claims priority to, and the benefit of, U.S. provisional patent application Ser. No. 62/757,994 filed on Nov. 9, 2018, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless local area network (WLAN) communications, and more particularly to the propagation of discovery assistance request and responses to neighboring stations.

2. Background Discussion

Higher capacities are always being sought for wireless local area networks (WLANs), especially in the millimeter wavelength (mm-Wave or mmW) regimes. Network operators have begun to embrace various concepts to achieve densification, such as in the Millimeter wave (mmW) regime including mesh networks and mixtures of mesh and non-mesh networks, are becoming increasingly important. Current sub-6 GHz wireless technology is not sufficient to cope with high data demands. One alternative is to utilize additional spectrum in the 30-300 GHz band which is often referred to as the millimeter wave band (mmW).

The efficient use of mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

When a new station (STA or node) is starting up in a location it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A station connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmW communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmW D2D and DN technologies.

However, the need for STAs to be constantly sending discovery signals (beacons or beamforming frames) makes inefficient use of spectrum while increasing latencies with transmissions being constantly interrupted to send beamforming signals even when they are not needed.

Accordingly, a need exists for enhanced discovery mechanisms which enhance internodal cooperation leading to enhanced network efficiencies. The present disclosure fulfills that need and provides additional benefits over previous technologies.

BRIEF SUMMARY

A protocol is disclosed which increases the efficiency of propagating discovery assistance between nodes (stations) in the network. Stations (STAs) that receive discovery assistance requests from a new STA trying to join a network, or STAs that needs to discover neighbor STAs, are configured for propagating the discovery assistance request to other STAs in its BSS, or in the surrounding area, to help the STA requesting assistance to find new neighbor STAs. The STA that received the propagated discovery assistance response responds to the request if it supports the discovery assistance feature by sending a discovery assistance response to the STA it received the propagated discovery assistance request from. The STA that sent the propagated discovery assistance request processes all the responses and sends a discovery assistance response to the STA that requested the discovery assistance request with information about the discovery assistance campaign.

The enhanced protocol increases network efficiencies for a number of reasons. STAs do not need to be constantly sending discovery signals (beacons or beamforming frames) making inefficient use of spectrum and increasing latencies with transmissions being constantly interrupted to send beamforming signals even when they are not needed. New STAs joining are able to obtain information about the channel access and the scheduling allocation in the channel and network it is connecting to. New STAs are made aware of beacon transmission times so that they don't miss beamforming frames. New STAs do not need to be continuously scanning (passive or active) for beamforming frames which results in wasted power. The disclosed protocol increases network efficiency because the STA is made aware of when and where the beamforming frames are transmitted or are to be transmitted.

The directional WLAN system, apparatus and method disclosed is applicable to a wide range of network applications, for example device-to-device (D2D), peer-to-peer (P2P), wireless and mesh networking applications which can be applied to wireless LAN (WLAN), wireless personal area networks (WPAN), and outdoor wireless communications. The target applications for example include, but are not limited to, Wi-Fi, WiGig, and other wireless networks, Internet of things (IoT) applications, backhauling and fronthaul of data, indoor and outdoor distribution networks, mesh networks, next generation cellular networks with D2D communications, and numerous other applications as will be readily recognized by one of ordinary skill in the art.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIGS. 14A and 14B is a communication interchange diagram of a second example of multiple stations propagating discovery assistance requests and responses according to an embodiment of the present disclosure.

FIG. 18 is a data field diagram of a Discovery Assistance information element according to an embodiment of the present disclosure.

FIG. 19 is a data field diagram of subfields within the discovery assistance control field seen in FIG. 18, according to an embodiment of the present disclosure.

FIG. 20 is a data field diagram of an extended schedule element according to an embodiment of the present disclosure.

FIG. 21 is a data field diagram of the allocation field seen in FIG. 20, according to an embodiment of the present disclosure.

FIG. 22 is a data field diagram of an allocation control subfield seen in FIG. 21, according to an embodiment of the present disclosure.

FIG. 23 is a data field diagram of DMG capabilities element according to an embodiment of the present disclosure.

FIG. 24 is a data field diagram of a directional multi-gigabyte (DMG) STA capability information subfield according to an embodiment of the present disclosure.

FIG. 25 is a data field diagram of an FST information Request frame according to an embodiment of the present disclosure.

FIG. 26 is a data field diagram of an FST information Response frame according to an embodiment of the present disclosure.

DETAILED DESCRIPTION

1. Definition of Terms

Figure 1:
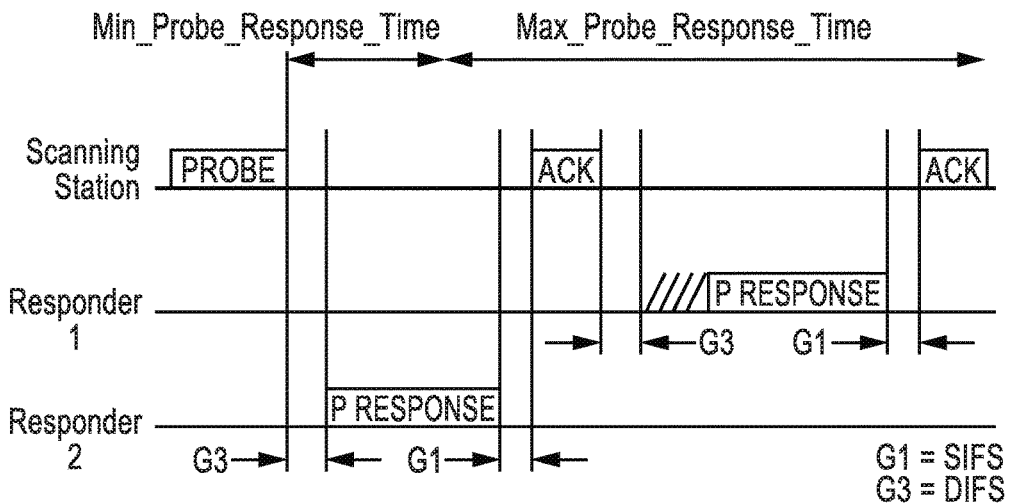
FIG. 1 is a timing diagram of active scanning performed in an IEEE 802.11 wireless local area network (WLAN).

A number of terms are utilized in the disclosure whose meanings are generally described below.

A-BFT: Association-Beamforming Training period; a period announced in the beacons that is used for association and beamform (BF) training of new stations (STAs) joining the network.

AID: Association Identification, is an identifier for the data link association between a station and an AP/PCP or BSS.

AP: Access Point: an entity that contains one station (STA) and provides access to the distribution services, through the wireless medium (WM) for associated STAs.

Beamforming (BF): a directional transmission from a directional antenna system or array for determining information for improving received signal power or signal-to-noise ratio (SNR) at the intended receiver, and under which stations can obtain information for correlating time and directional allocation information.

BSS: Basic Service Set is a set of stations (STAs) that have successfully synchronized with an AP in the network.

BI: the Beacon Interval is a cyclic super frame period that represents the time between beacon transmission times.

BRP: BF Refinement protocol is a BF protocol that enables receiver training and iteratively trains transmitter and receiver sides to optimize (achieve the best possible) directional communications.

BSS: Basic Service Set, is a component of the IEEE 802.11 WLAN architecture, built around a BSS which is actually a set of STAs connecting to the wireless medium allowing the STAs to communicate with each other.

BTI: Beacon Transmission Interval is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

DMG: Directional Multi-Gigabit is a form of high throughput wireless communications described in IEEE 802.

EDMG: Extended Directional Multi-Gigabit is an extended form of DMG.

FST: Fast Session Transfer is the transfer of a session from one physical channel to another channel when the communicating STAs both have similar capabilities in the frequency band over which they communicate. It should be noted that during a communication session the STAs retain state information about the established PHY link.

DTI: Data Transfer Interval is the period in which full BF training is permitted followed by actual data transfer, and DTI can include one or more service periods (SPs) and contention-based access periods (CBAPs).

LOS: Line-of-Sight, a communication in which the transmitter and receiver are ostensibly within sight of one another, and not the result of communication of a reflected signal; the opposite condition is NLOS for non-line-of-sight in which stations are not in LOS of one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

MCS: Modulation and Coding Scheme; defines an index that can be translated into the physical (PHY) layer (e.g., OSI model) data rate.

Omni-directional: a mode of transmission utilizing a non-directional antenna.

PBSS: Personal Basic Service Set (PBSS) defined in 802.1ad, which is similar to an independent BSS (IBSS), but the PBSS is a type of IEEE 802.11 ad hoc network in which STAs are able to communicate directly with each other without relying on special devices like APs.

PCP: PBSS Control Point; in an ad-hoc network one of the participating stations can take the role of the PBSS Control Point, which acts similarly to an AP, announcing the network and organizing accesses.

Quasi-Omni directional: is a mode of communication utilizing a directional multi-gigabit (DMG) antenna with the widest beamwidth attainable.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SSID: service Set Identifier is the name assigned to a WLAN network.

STA: Station is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information is collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

Transmit Sector Sweep (TXSS): is transmission of multiple Sector Sweep (SSW) or Directional Multi-gigabit (DMG) Beacon frames via different sectors, in which a sweep is performed between consecutive transmissions.

2. Existing Directional Wireless Network Technology 2.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

2.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
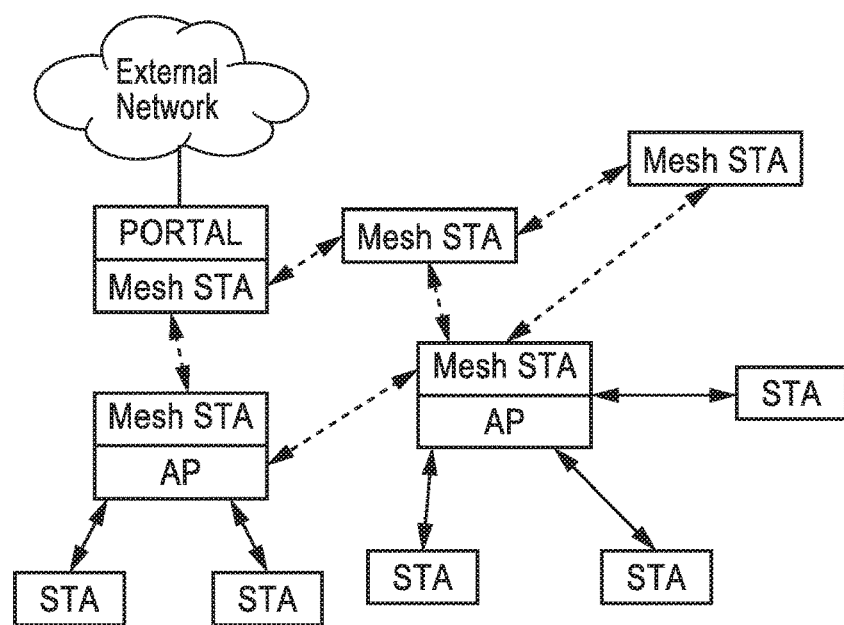
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
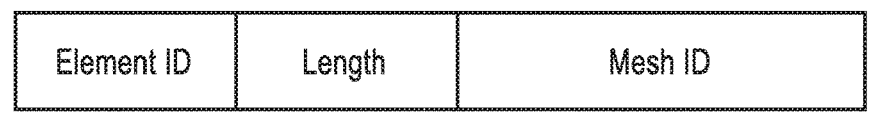
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

2.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

2.4. IEEE 802.11Ad Scanning and BF Training

An example of a mmW WLAN state-of-the-art system is the 802.11ad standard.

2.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

2.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

2.4.3. 802.11Ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provides the best link quality (e.g. SNR), or will otherwise support communications between the stations.

Figure 5:
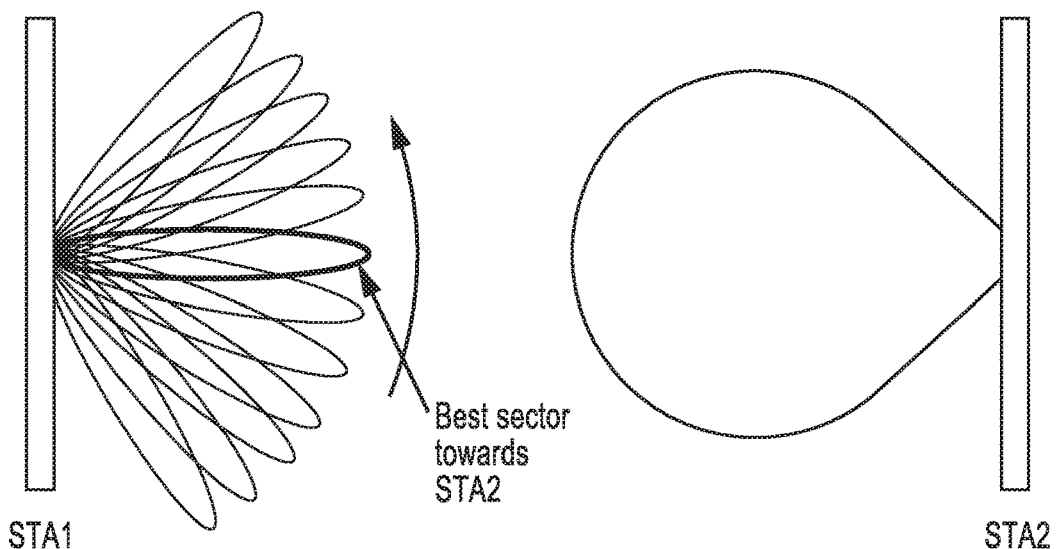
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
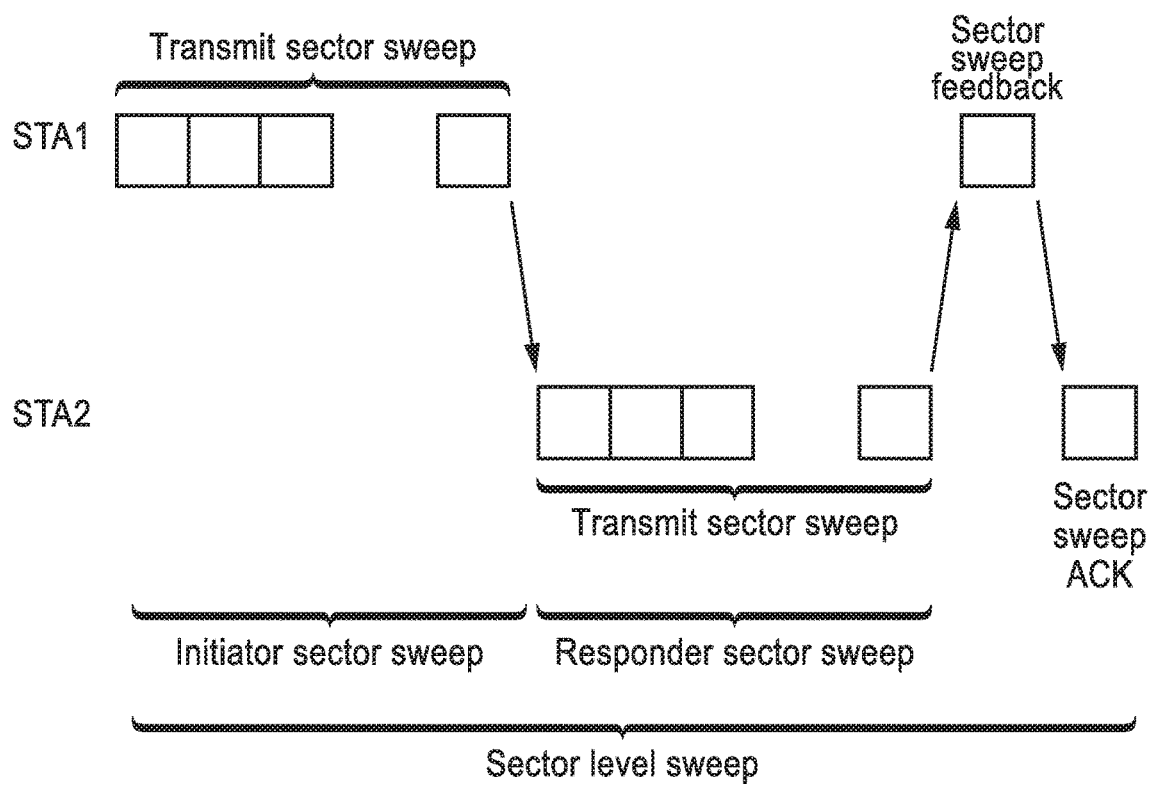
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

3. Station (STA) Hardware Configuration

Figure 10:
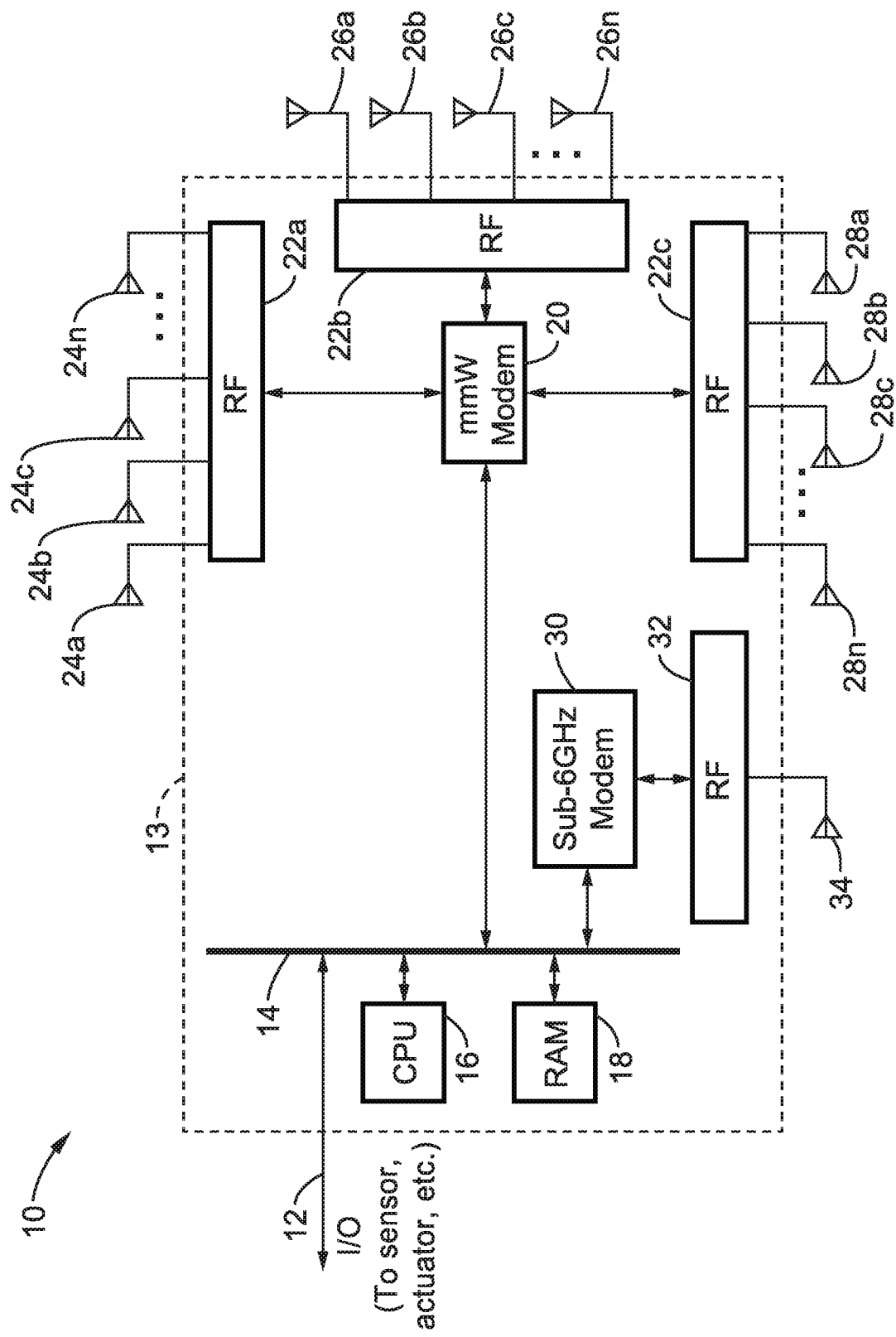
FIG. 10 is a block diagram of a WLAN communications station hardware as utilized according to an embodiment of the present disclosure.

FIG. 10 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination), depending on what role it is playing in the current communication context. This host machine is shown configured with a mmW modem 20 coupled to radio-frequency (RF) circuitry 22a, 22b, 22c to a plurality of antennas 24a-24n, 26a-26n, 28a-28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 11:
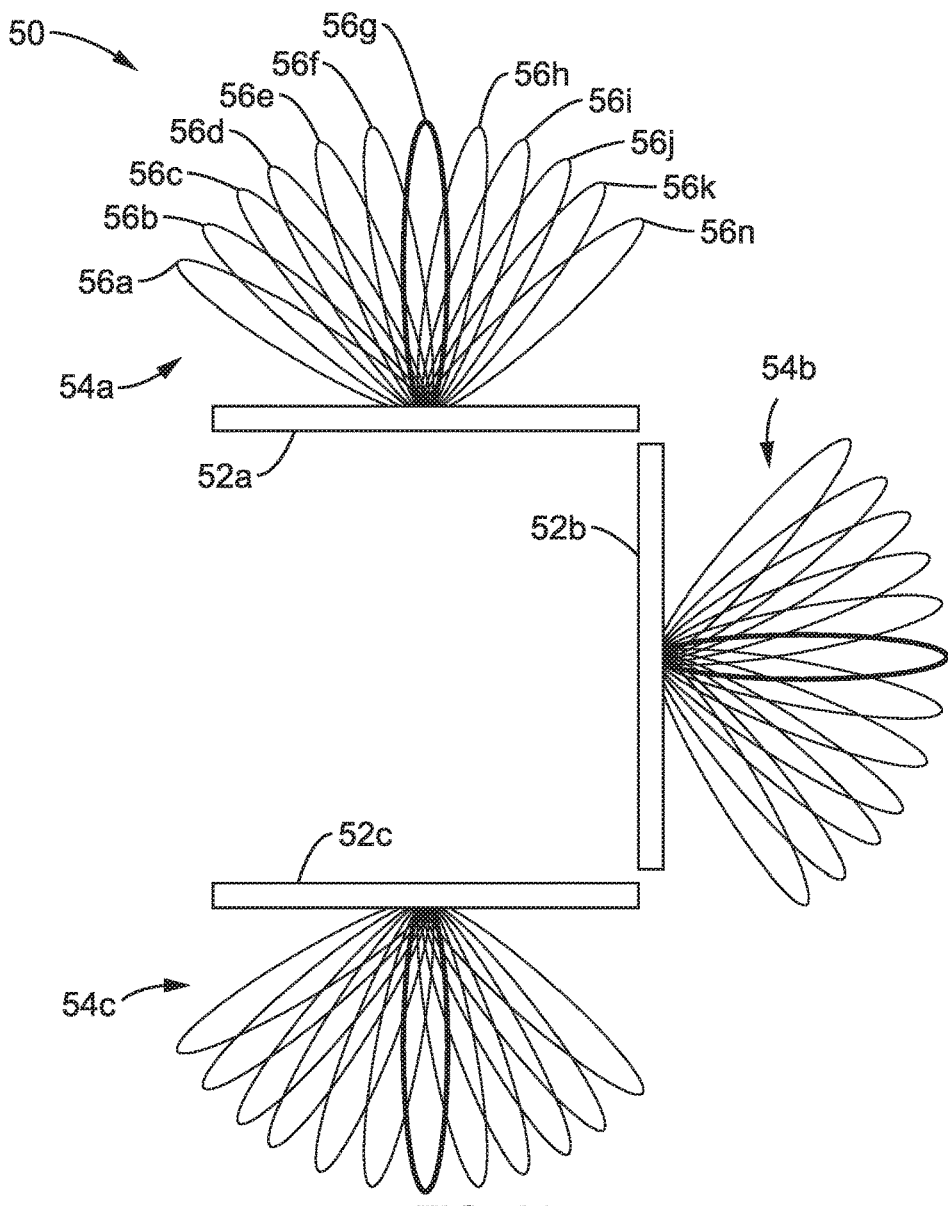
FIG. 11 is a mmW beam pattern diagram for the station hardware of FIG. 10 as utilized according to an embodiment of the present disclosure.

FIG. 11 illustrates an example embodiment 50 of mmW antenna directions which can be utilized by a STA to generate a plurality (e.g., 36) of mmW antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmW RF circuitry and beamforming commanded by the mmW array antenna controller. Although it is possible that STA hardware components have different functional partitions from the one described above, such configurations can be deemed to be a variant of the explained configuration. Some of the mmW RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
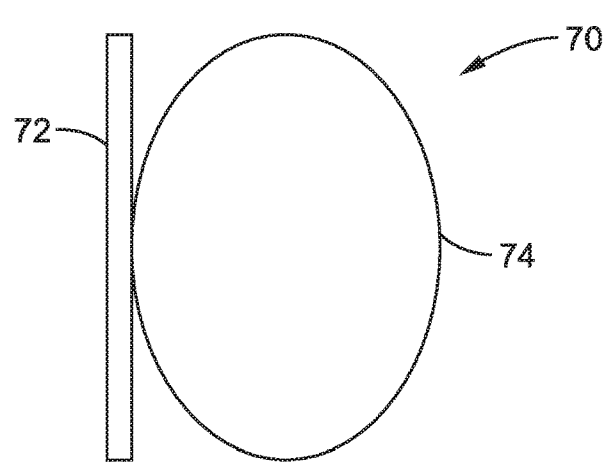
FIG. 12 is a beam pattern diagram for a discovery band communications Omni-antenna, or Quasi-Omni-antenna, (i.e., sub-6 GHz), according to an embodiment of the present disclosure.

FIG. 12 illustrates an example embodiment 70 of antenna pattern for the sub-6 GHz modem assumed to use a Quasi-Omni antenna 74 attached to its RF circuitry 72, although other circuitry and/or antennas may be utilized without limitation. It should be appreciated that the present disclosure can support stations using Quasi-Omni-directional and/or Omni-directional communications, wherein reference to one of these types in the specification generally implies the other as well.

4. Discovery Assistance Contribution of the Disclosure

A new STA requests assistance from a discovered STA by exchanging assistance request and assistance response information elements. These elements can be added to any frames exchanged between the discovered STA and the new STA. For example these elements can be exchanged through: (a) Assistance Request and Assistance response Frames; (b) Fast Session Transfer (FST) Request and FST Response Frames if discovery was on a different band; (c) Information Request or Information Response frames; (d) Probe Request and Probe Response frames; and (e) Association or Re-association Request or Response Frames, or other message/beacon frames being communicated.

The Assistance Request and Assistance Response information elements contain the following information: (a) STA address, (b) DMG capability information, (c) antenna capability information, (d) communication band information, (e) communication band scanning mode request and response, (f) discovery assistance window request and response, (g) new node dwelling time for request and response, (h) assistance request response.

If the discovery assistance request is accepted, the STA triggers on-demand sector sweeping, or beamforming, with the STA that requested discovery assistance. This can be performed by this protocol in two different ways: (1) through either sending details of the start time and period in which on-demand sweeping is to be performed, or (2) by scheduling beamforming training periods between the STA requesting and the STA providing discovery assistance. The STA receiving the discovery assistance request decides whether to propagate the request to other STAs in its BSS, or its surrounding, which are to assist the STA requesting discovery assistance. The STA receiving the discovery assistance request collects the responses to all discovery assistance requests sent and forwards one response to the STA requesting discovery assistance.

4.1. Discovery Assistance w/On-Demand SSW Triggering

Figure 13A:
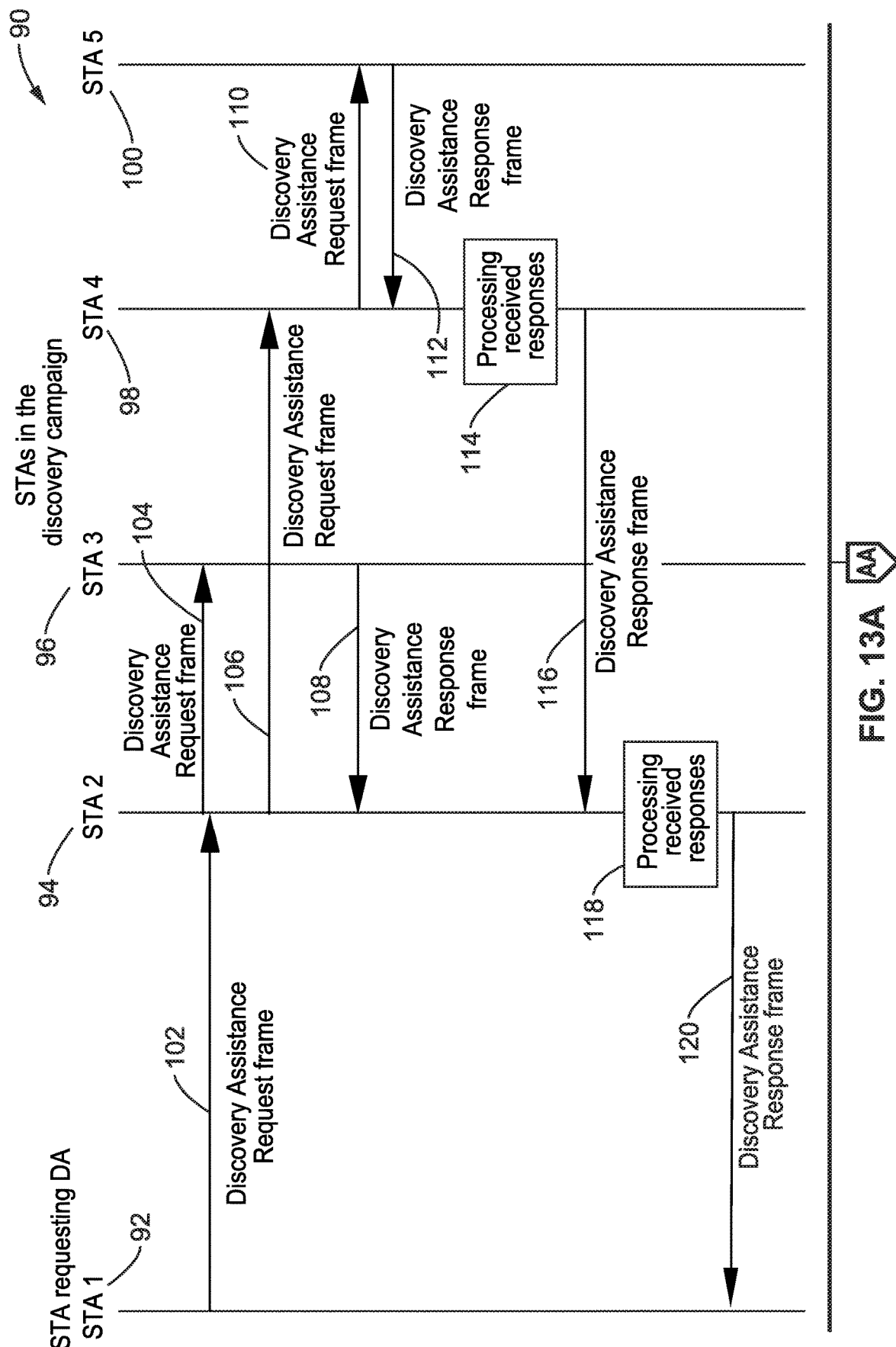
FIGS. 13A and 13B is a communication interchange diagram of a first example of multiple stations propagating discovery assistance requests and responses according to an embodiment of the present disclosure.
Figure 13B:
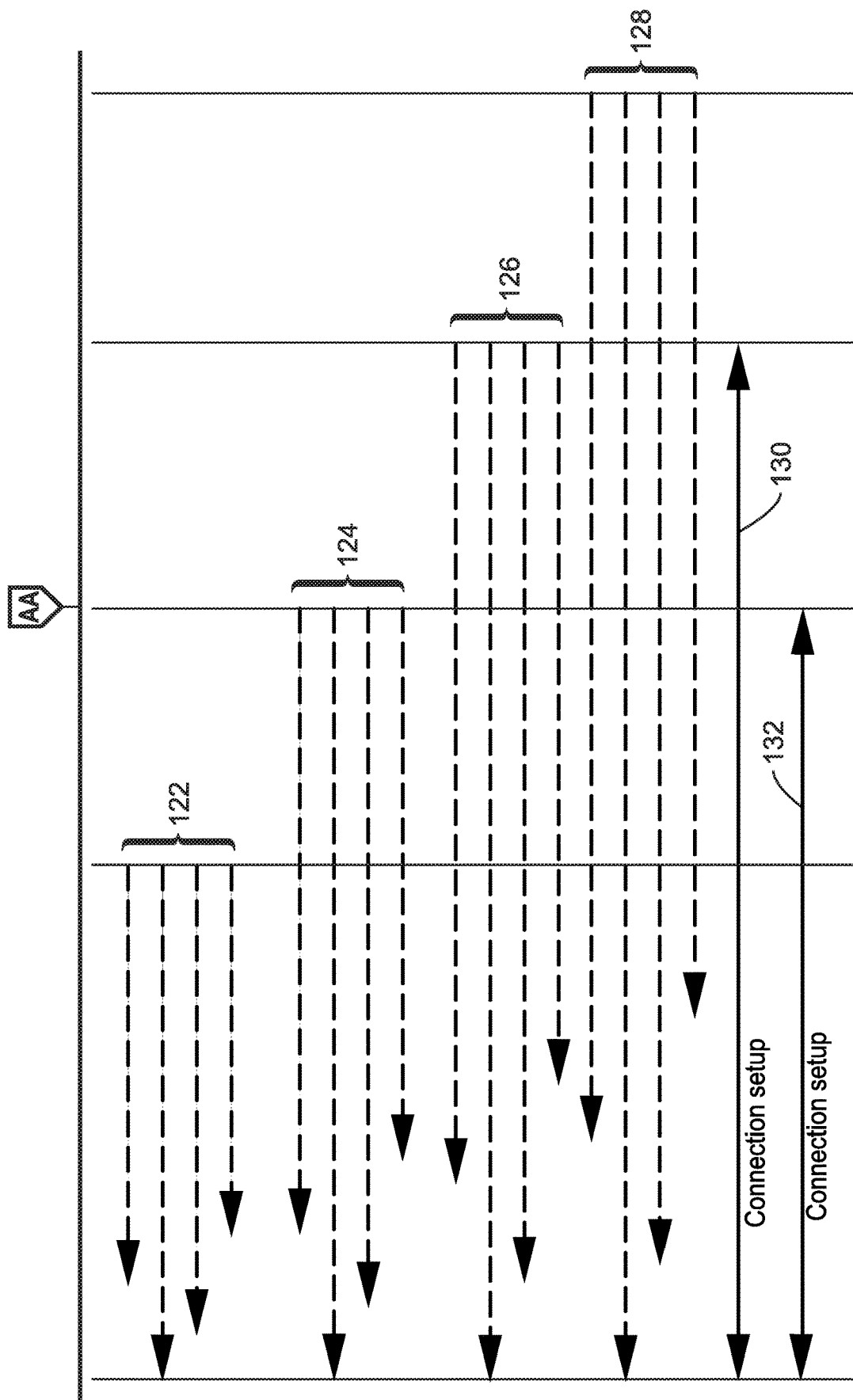

FIG. 13A and FIG. 13B illustrate an example embodiment 90 of STA 1 92, STA 2 94, STA 3 96, STA 4 98, STA 5 100 cooperating on discovery assistance. Starting in FIG. 13A of this example STA 1 sends a discovery assistance (DA) request 102 to STA 2. STA 2 propagates 104, 106 that request to STA 3 and STA 4 after deciding on discovery assistance type. STA 3 responds to the request by sending a DA response 108 to STA 2. STA 4 decides to propagate 110 that request to STA 5. STA 5 responds to the request by sending 112 DA response to STA 4. STA 4 processes 114 the received response with its own response to the request received from STA 2 and sends one DA response 116 to STA 2 that contains the information of the DA offered from STA 4 and STA 5. STA 2 processes 118 all received DA responses and sends one DA response 120 to STA 1 containing information about the discovery assistance provided to STA 1 from STA 2, STA 3, STA 4 and STA 5.

In this example STA2 decides on discovery assistance type through on-demand sector sweeping, STAs responding to the discovery assistance request adds the time when the discovery assistance is going to start. STA 2 process all responses and forward to STA 1 the time when all the discovery signaling is going to start and the duration of the discovery assistance campaign.

All STAs that agreed to offer DA, start on-demand sector sweeping, as seen in FIG. 13B, at the time they selected and reported in the responses. STA 1 receives beamforming frames 122, 124, 126, 128 from other STAs and sets up connections 130, 132 with STAs it is interested in communicating with.

4.2. Discovery Assistance w/Scheduled Beamforming Periods

Figure 14A:
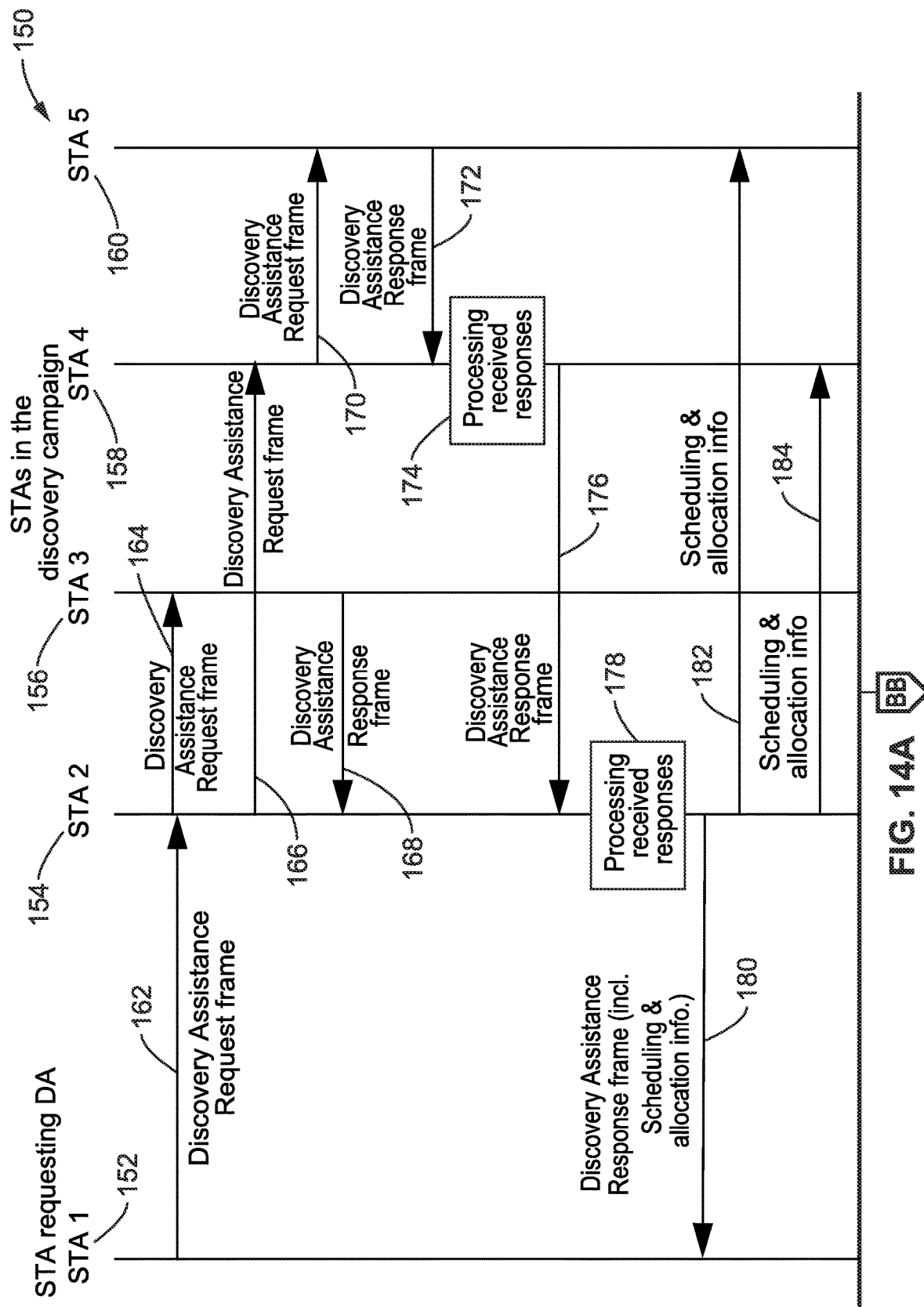

FIG. 14A and FIG. 14B illustrate an example embodiment 150 of STA 1 152, STA 2 154, STA 3 156, STA 4 158, STA 5 160 cooperating on discovery assistance. In FIG. 14A an example is seen of STA 1 sending 162 a DA request to STA 2. STA 2 propagates 164, 166 that request to STA 3 and STA 4 after deciding on the discovery assistance type. STA 3 responds to the request by sending DA response 168 to STA 2. STA 4 decides to propagate 170 that request to STA 5. STA 5 responds to the request by sending DA response 172 to STA 4. STA 4 processes 174 the received response with its own response to the request received from STA 2 and sends one DA response 176 to STA 2 that contains the information of the DA offered from STA 4 and STA 5. STA 2 processes 178 all received DA responses and sends one DA response 180 to STA 1 containing information about the discovery assistance provided to STA 1 from STA 2, STA 3, STA 4 and STA 5.

In this example STA2 decides on discovery assistance type through beamforming training scheduling, and the STAs responding to the propagated discovery assistance request add the time required for beamforming with the STA requesting discovery assistance to the response. STA 2 process all responses and forward to STA 1 the acceptance response to the discovery assistance request as well as the scheduling and allocation 182, 184, 186, 188, crossing into FIG. 14B, of the beamforming periods with other STAs. This information can be attached to the response message sent to STA 1, for example adding the extended schedule element to the discovery assistance response sent to STA 1 or by sending the schedule later with a beacon frame or announce frame for example. STA 2 sends the schedule and allocation information to STA 3, STA4 and STA 5 as well. STA 2 can perform this, such as for example attaching the extended schedule element to a frame sent to the participating STAs like a DMG beacon or an announce frame or any other frame. The order of sending the frames with the scheduling and allocation information to STA 1, STA 3, STA 4, STA 5 should be such that it is sent to the STAs before the start of the beamforming allocation periods.

All STAs that agreed to offer DA commence on-demand sector sweeping 190, 192, 194, 196 at the time selected and reported in the responses. STA 1 receives beamforming frames from other STAs and sets up connections 198, 200 with STAs it is interested in communicating with.

5. Discovery Assistance Propagation Procedure

5.1. BSS STA Offering Assistance

STAs can offer discovery assistance to other STAs by triggering on-demand sector sweeping or scheduling a beamforming training period whenever a request is received from a STA requesting discovery assistance. The STA offering discovery assistance is configured to either announce its capability to provide discovery assistance, or to wait until it is requested and then respond if it is supported. The STA discovery assistance capability announcement can be communicated through either of the following mechanisms. (1) The announcement can be sent by broadcasting capability on different bands, for example a lower band. For example, transmitting the multi-band element with an indication of a discovery assistance feature on a different band identified in the multi-band element. The multi-band element can be sent with a beacon, probe response, association response or any other frame that is sent to the STA requesting discovery assistance. (2) The announcement can be sent by broadcasting capability on the DMG capabilities element. This element contains DMG capabilities of the STA and is broadcast to other STAs connected to the STA or in its surrounding area. For example, this element can be broadcast with the beacon, announcement frame, probe response, information response, or any other frame directed to the STA requesting discovery assistance.

The STA offering discovery assistance can respond to a discovery assistance request without announcing its capability. In this case, only STAs with discovery assistance capability will respond to a discovery assistance request, otherwise it will ignore the request.

Upon receiving a discovery assistance request, the STA decides on whether it should provide discovery assistance and if the discovery assistance request is accepted, the STA sends a discovery assistance response. The discovery assistance request can be within a fast session transfer (FST) setup request, or response, frame which includes a discovery assistance element, or which contains an information request frame containing a discovery assistance element. The discovery assistance element contains information to guide the STA requesting discovery assistance whether the DA is accepted and how the discovery assistance is performed if it is accepted.

The BSS STA has the option to conduct the DA in multiple ways; the following describes two methods, by way of example and not limitation. (1) Beacon sweeping can be performed in which the BSS STA can commence sweeping beacons or beamforming frames during the BTI. The transmission of the beamforming frames can be scheduled after some beacon intervals according to the STA decision. The sweeping can be performed as a full exhaustive sweeping in one BI, or it can be a fragmented partial sweeping. The details of the beamforming frames sweeping schedule is included in the DA element. (2) Scheduled beamforming can be performed in which the BSS STA can schedule a period of time in the DTI to exchange the beamforming frames with the new STA. The beamforming exchange can be initiated by the STA requesting DA or the BSS STA. The details of the scheduled beamforming is included in the DA element and additional elements that can be attached to the Discovery assistance response frame or sent to the STA requesting discovery assistance like the extended schedule element, TDD SP slot structure element and the TDD SP slot schedule element.

The BSS STA is configured to start offering discovery assistance if the DA request is accepted as conveyed in the DA element and the other elements.

5.2. STA Requesting Discovery Assistance

A STA can request discovery assistance from other STAs in its surrounded area after discovering their existence, or to look for more neighbors beyond the stations that it is aware of. The STA requesting discovery assistance sends a discovery assistance request to the STA it is requesting discovery assistance from. This discovery assistance request can be a frame sent in the same band, for example in the mmW band over which the STA is interested in making a connection, or in a different band such as for example a sub-6 GHz band.

The STA requesting discovery assistance can be made aware of the STA it is requesting DA from, through discovery on a lower band or it might be already connected to it in the mmW band and the request is for finding new neighbors. The STA requesting DA sends the discovery assistance request and attaches the DA element to the request. The STA requesting DA receives from a BSS STA a discovery assistance response with a DA element attached to it. If the DA request is accepted, the STA requesting DA according to the information in the response receives the DA offered by the BSS STAs. If the DA request is rejected, the new STA can search for a new BSS STA to request assistance from, or resend the DA request to the same BSS STA. If the new STA DA request is accepted, the new STA gets information about the offered assistance through the attached DA element.

The Discovery assistance can be provided in different ways according to the disclosure, for example in the following two ways. (1) Discovery assistance can be provided during Beacon Sweeping, in which the new STA obtains information from the DA element on the time in which the beacon is starting and the time and frequency of sweeping the beacons. The new STA uses this information to scan the channel at the time of transmission to find the beacons. (2) Discovery assistance can be provided in response to Scheduled beamforming, in which the new STA is informed that the beamforming will be performed through a scheduled period. The DA element informs the type of DA and the details of the discovery assistance scheduled period is contained in the extended schedule element. The TDD slot structure element and the TDD schedule element are attached to the DA response frame if available.

Figure 15A:
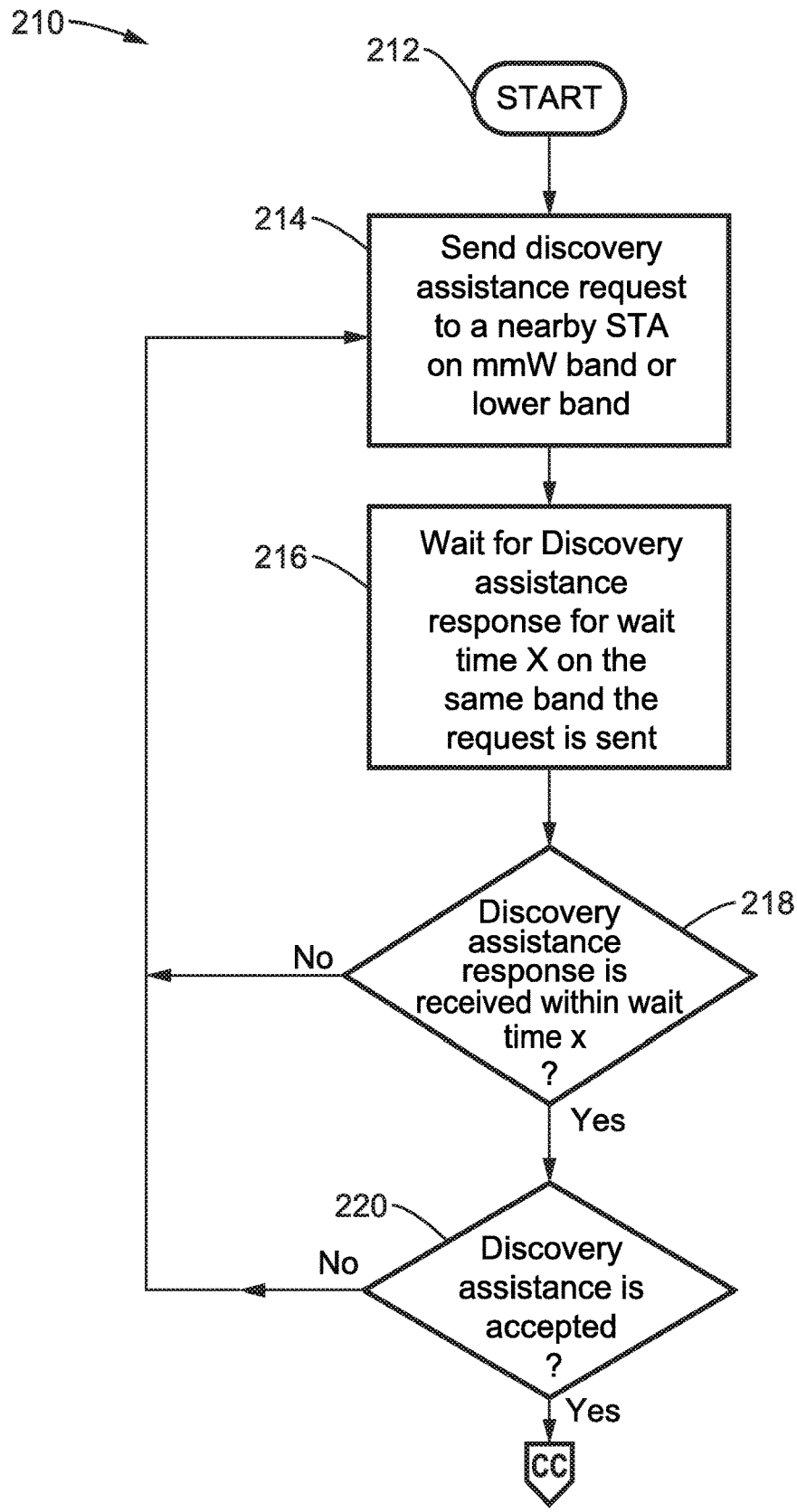
FIGS. 15A and 15B is a flow diagram of a station requesting discovery assistance and processing the discovery assistance response according to an embodiment of the present disclosure.
Figure 15B:
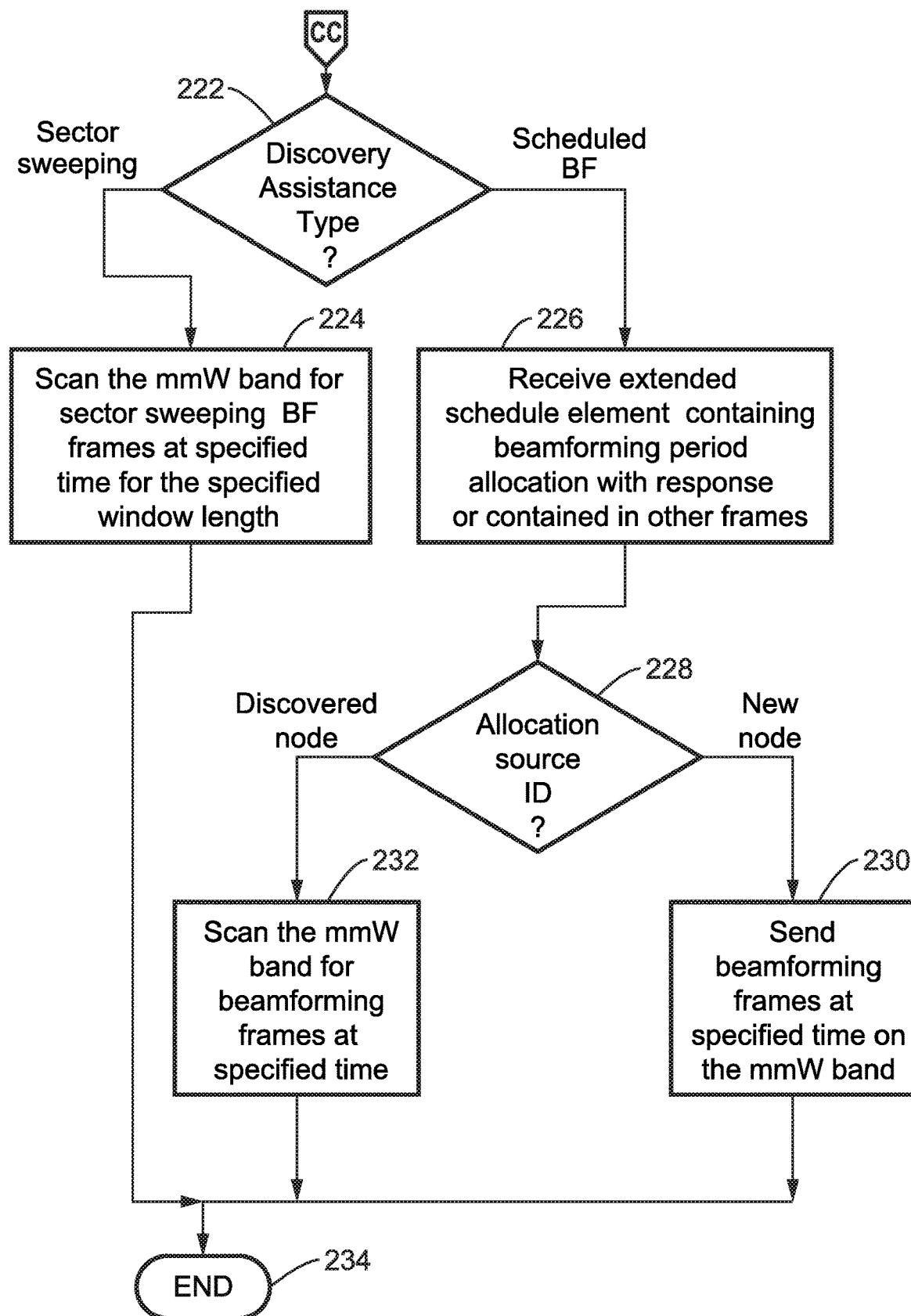

FIG. 15A and FIG. 15B illustrates an example embodiment 210 of a STA requesting DA and handling receiving the discovery response. The process commences 212 with the new station sending 214 a discovery assistance request to a nearby STA (e.g., on mmW or another band). A wait 216 is seen for a discovery assistance response for a period of time on the same band that the request it sent. A check is made 218 if the response was received within the given wait time. If it was not received within the wait time x, then execution moves back to block 214. Otherwise, execution reaches block 220 which makes the decision if the discovery assistance request is to be accepted. If it is not accepted, then execution reaches block 214. Otherwise, if the discovery assistance request is accepted, then a check 222 is made in FIG. 15B to determine discovery assistance type. If the type is determined to be sector sweeping, then block 224 is reached which scans the mmW band for sector sweeping BF frames at the specified time for the specified window length, and the process ends 234. Otherwise, the type is determined to be scheduled BF and block 226 is reached which receives the extended scheduling element containing beamforming period allocation with a response contained in other frames. A decision is then made at block 228 regarding the allocation source ID. If the ID is that of a discovered node (station), then at block 232 the mmW band is scanned for beamforming frames at the specified time, before the process ends 234. Otherwise, if the ID is that of a new node (station), then at block 230 beamforming frames are sent at the specified time on the mmW band before the process ends 234.

5.3. STA Propagating Discovery Assistance Request

A STA can propagate a discovery assistance request that was received from a STA requesting discovery assistance for itself, or for another STA to its surrounding STA if it supports this feature. If the STA is receiving the discovery assistance request from a STA requesting discovery assistance for itself, it will make a decision about the type of discovery assistance offered and propagate that request to other STAs in its surrounding area or BSS. If the STA is receiving the discovery assistance request from a STA propagating it from the STA requesting the discovery assistance, it will propagate the request as is.

The type of discovery assistance offered can be of multiple types, for example either (1) sector sweeping of beamforming frames that start at a specific time, or (2) scheduled beamforming training periods allocated to both the STA requesting DA and the STA offering DA.

In at least one embodiment the propagated request contains the DMG capabilities element of the STA requesting DA and the discovery assistance information element in which: (1) the DMG capabilities element contains information about the DMG capabilities of the STA requesting DA, and/or (2) the discovery assistance information element contains information regarding the type of discovery assistance requested by the STA requesting DA. The STA propagates the DA request to neighboring STAs and waits for a discovery assistance response from the neighbor STAs.

After some wait time, or if the responses for the requests sent to the neighbor STAs are all received, then the STA sends a response to the STA requesting discovery assistance with information about the discovery campaign offered by itself and other STAs responded to its request.

In at least one embodiment, the response sent to the STA requesting discovery assistance carries the following information: (a) the type of discovery assistance offered; (b) the time when the first STA starts the sector sweeping and the window length over which all STAs will finish their discovery assistance are sent in the response, if the discovery assistance was offered through sector sweeping; (c) sending scheduling information to the STA requesting discovery assistance and to all STAs offering discovery assistance prior to the time of the scheduled beamforming training if the discovery assistance was offered through scheduled beamforming training.

Figure 16A:
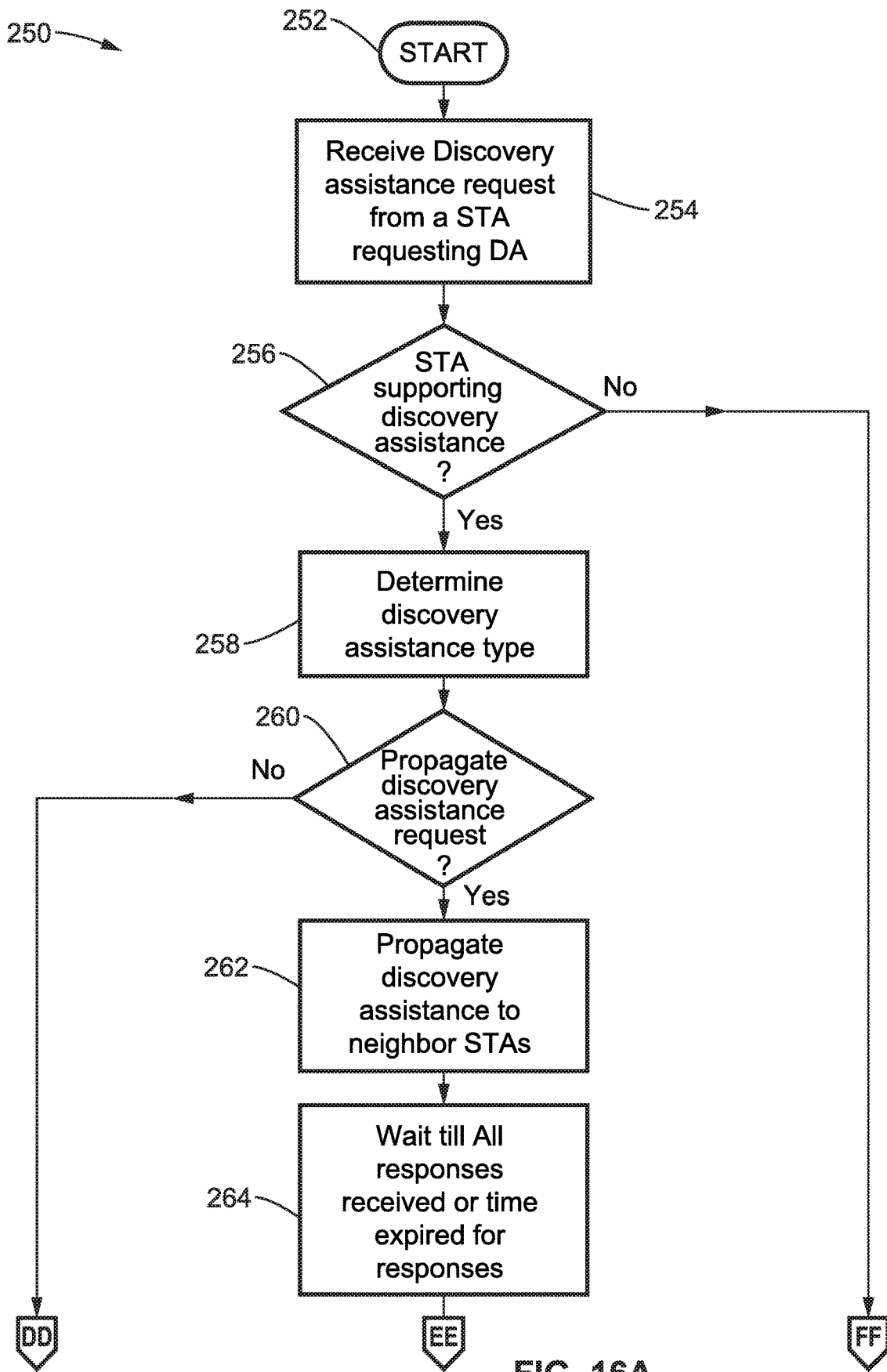
FIGS. 16A and 16B is a flow diagram propagating a discovery assistance request according to an embodiment of the present disclosure.
Figure 16B:
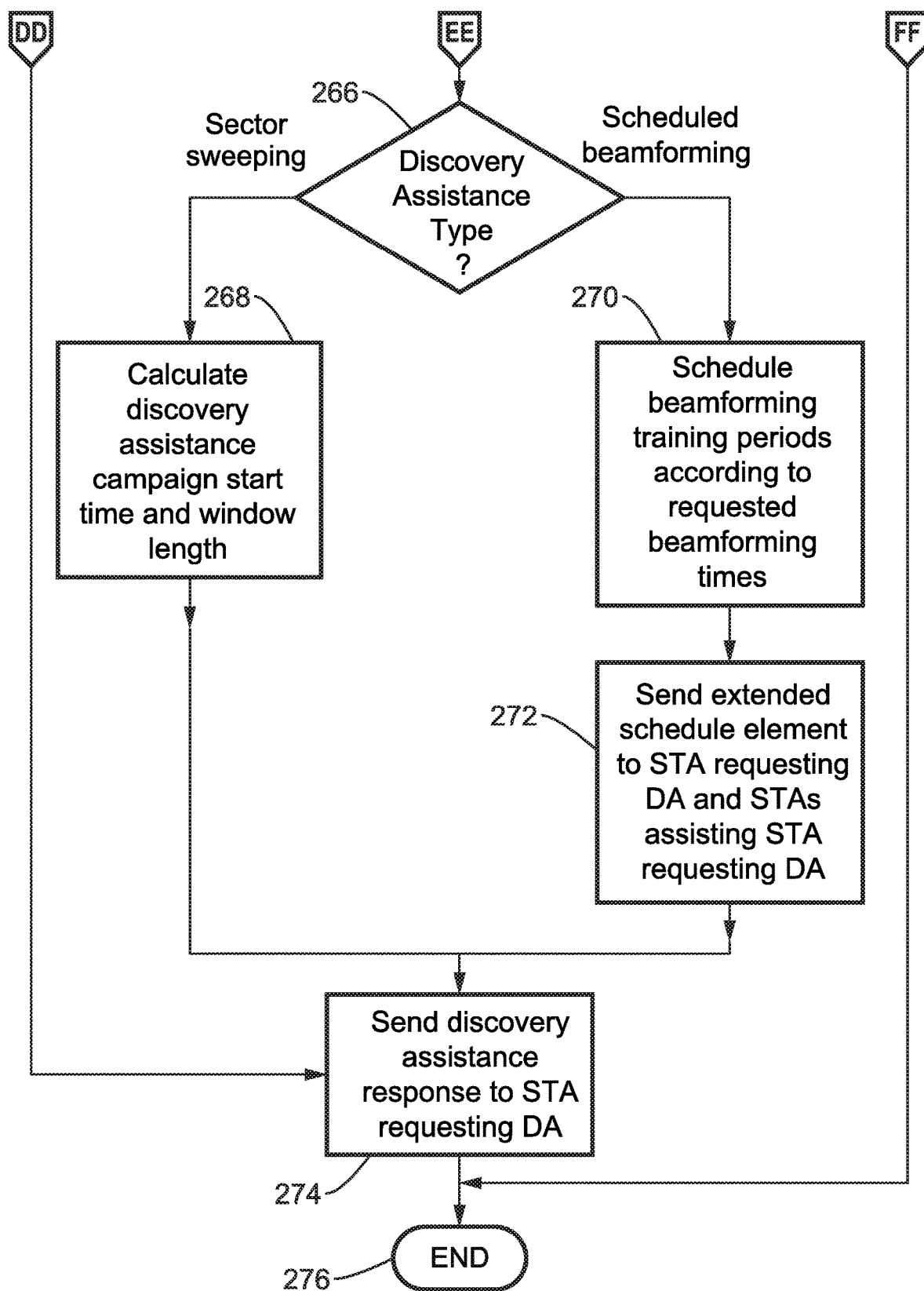

FIG. 16A through FIG. 16B illustrate an example embodiment 250 of particulars steps when a STA receives a discovery assistance request and propagates it to other neighboring STAs. Execution starts 252 in FIG. 16A with a discovery assistance request being received 254 from a station requesting discovery assistance (DA). A check is made 256 if the STA supports discovery assistance. If the STA does not support DA, then execution moves into FIG. 16B at the end 276 of processing. Otherwise, the discovery assistance type is determined 258 and a check made 260 to determine if the discovery assistance request is to be propagated. If the request is not to be propagated, then execution moves to block 274 in FIG. 16B which sends the discovery assistance response to the STA requesting the DA, before the process ends 276.

Otherwise, since the DA request is to be propagated, then discovery assistance is propagated 262 to neighbor STAs, and a wait 264 performed until all responses are received, or the time has expired for receiving the responses, after which check 266 in FIG. 16B determines the discovery type. If the discovery type is Sector sweeping, then at block 268 the start time and window lengths for the discovery assistance campaign are determined, before reaching block 274 in sending a discovery assistance response to the STA requesting the DA and ending 276 the process. If the discovery type is Scheduled beamforming, then at block 270 beamforming training periods are scheduled according to requested beamforming times, followed by sending 272 extended scheduling elements to the STA requesting the DA, and to STAs assisting that STA. Then block 274 is reached which send a discovery assistance response to the STA requesting the DA and ending 276 the process.

5.4. STA Responding to Propagated DA Request

A STA that supports discovery assistance can respond to a discovery assistance request from another STA. If the STA supporting discovery assistance decided to reject the discovery assistance response, it will respond to the request with a discovery assistance response containing a reject status code. If the STA supporting discovery assistance decides to accept the discovery assistance response, it responds to the request with a discovery assistance response having a non-reject (accept) status code and populates the discovery assistance element and sends the responses as follows. (a) If the discovery assistance is offered through sector sweeping, the time when the STA starts the sector sweeping and the window length over which the STA is offering discovery assistance are sent in the response. The STA uses the DMG capabilities element of the STA requesting DA sent with the DA request to calculate the time required to finish the sector sweeping. (b) If the discovery assistance is offered through scheduled beamforming training, the STA sends the time required to complete the beamform training with the STA requesting DA. The STA uses the DMG capabilities element of the STA requesting DA sent with the DA request to calculate the time required for the beamforming period.

Figure 17A:
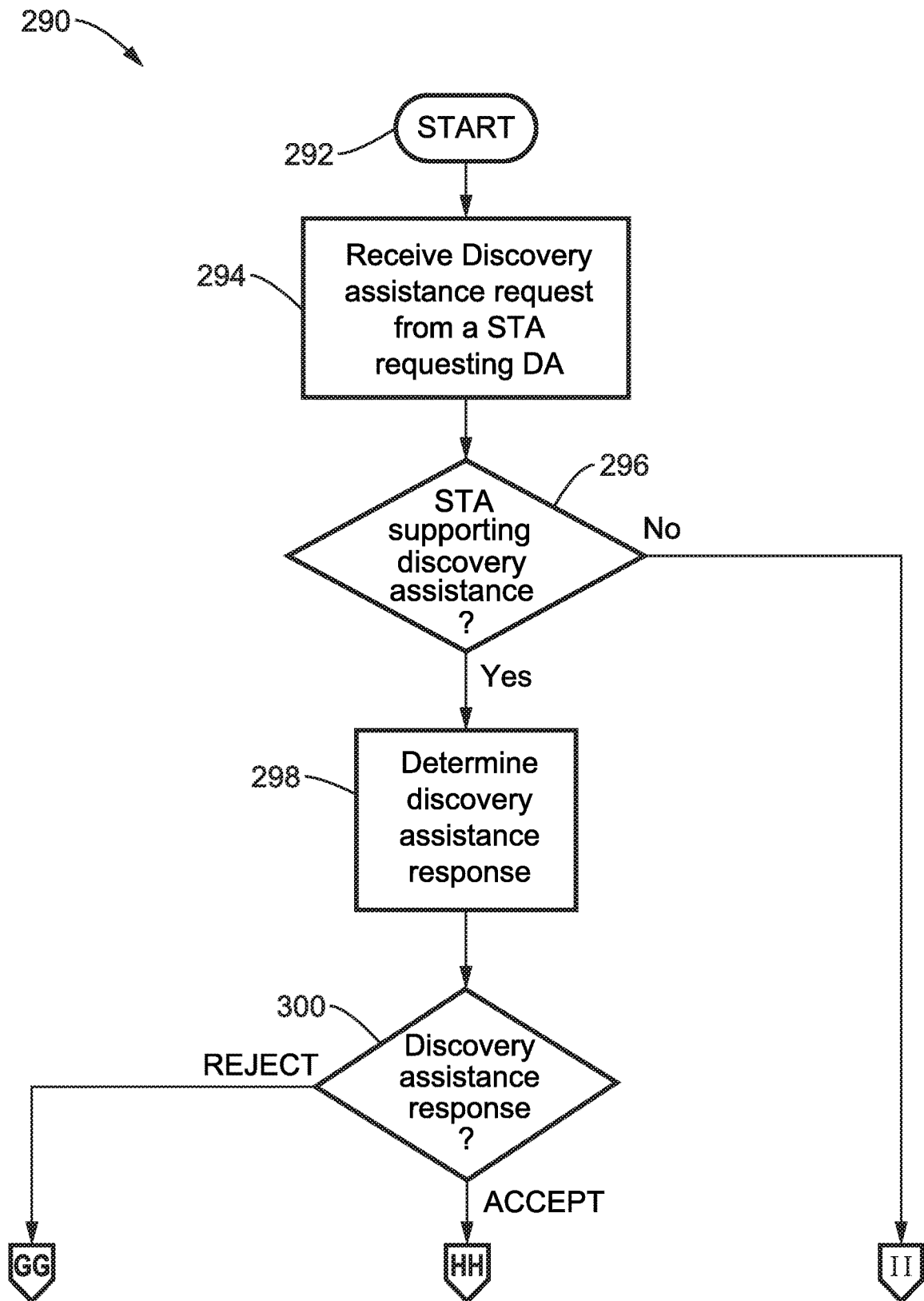
FIGS. 17A and 17B is a flow diagram of processing a received discovery assistance request that has been propagated according to an embodiment of the present disclosure.
Figure 17B:
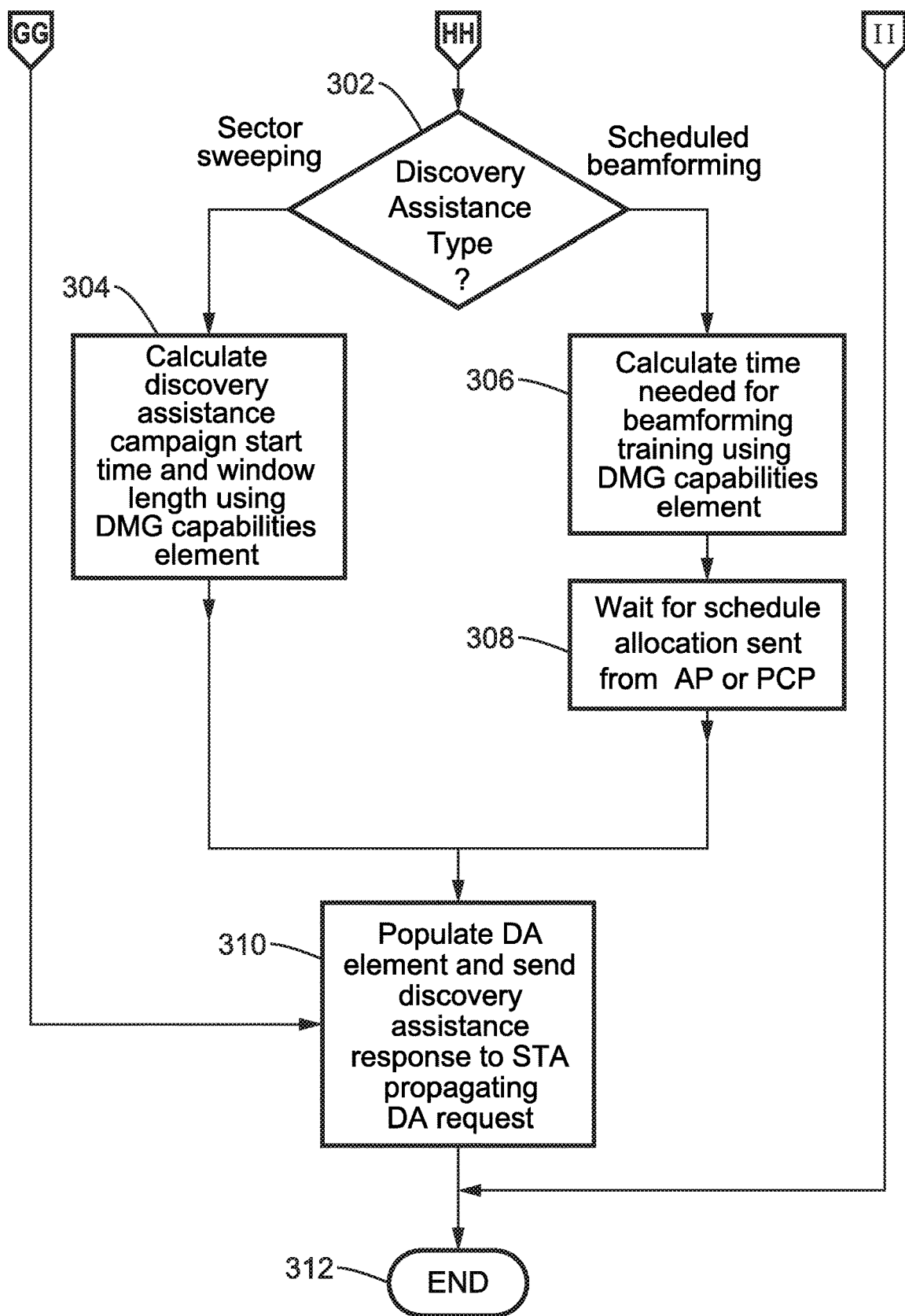

FIG. 17A and FIG. 17B illustrate an example embodiment 290 of the STA receiving a propagated discovery assistance request and how to respond to it. In FIG. 17A, the process starts 292 with receiving 294 a discovery assistance request from a station requesting discovery assistance (DA). A check is made 296 if this receiving station supports discovery assistance. If discovery assistance is not supported, then the process ends 312 in FIG. 17B. Otherwise, since discovery assistance is supported, block 298 is reached which determines the discovery assistance response, after which a check 300 is made for the type of response. If the response is to reject the DA, then block 310 in FIG. 17B is reached which populates the DA element and sends a discovery assistance response to the STA propagating the DA request, before ending 312 the process.

Otherwise, if block 300 in FIG. 17A determines to accept the DA request, then decision block 302 is reached in FIG. 17B which checks how it will perform the discovery assistance. If it will perform sector sweeping, then block 304 uses DMG capability elements to determine time and window length for the discovery assistance campaign, and reaches block 310. Otherwise, if scheduled beamforming is to be provided, then at block 306 the DMG capabilities element is used for determining the time needed for beamform training, and it then waits 308 for the schedule allocation from an AP or PCP, before reaching block 310. Block 310 populates the DA element and sends a discovery assistance response to the STA propagating the DA request, before ending 312 the process.

6. Information Elements (IE) Definitions

FIG. 18 illustrates an example embodiment 330 of a Discovery Assistance information element which contains all information necessary to trigger the beamforming process. The Element ID and Length fields define the ID of the element and its length. The discovery assistance control field controls aspects of the discovery process and is described below. The BTI field represents the time interval in Time Units between the start of the first DMG Beacon frame transmission, during the assisted discovery window in a beacon interval, to the end of the last DMG Beacon frame transmission by the STA in the same beacon interval. The Beamforming Start TSF represents the time over which the discovery assistance will commence. This time can represent the start of the DMG beacon sweep, the TDD SP beamforming, or the expected time for the new STA to start active scanning. The value can be the lower four octets (8 bits or byte) of the TSF of the DMG BSS at the time the beamforming frame transmission starts. The Discovery Assistance Window Length indicates the time in Time Units the discovered STA is offering Discovery assistance. During this time the discovered STA is sending beamforming beacons or frames to the new STA or listening to the new STA for beamforming frames or probes. The Dwelling Time field indicates the recommended time for the new STA to sweep the received antenna pattern in scanning for beamforming or discovery signal in microseconds. The Temporary Association ID (AID) contains a value assigned by the BSS STA to the new STA to represent a temporary AID for the new STA. The new STA used this value to identify scheduled periods by the BSS STA to the new STA in case the extended schedule element is provided.

FIG. 19 illustrates an example embodiment 340 of the discovery assistance control field from FIG. 18, whose subfields are given as follows. The Request/Response indication subfield is used to inform the receiving node whether the frame containing this element represents a request for discovery assistance (request element) or a response to a discovery assistance request that is sent from the receiving node (response element). If this field is set to a request, the receiving node triggers the discovery assistance protocol upon receiving this element. If the field is set to response, then the receiving node extracts the response information to receive discovery assistance from the transmitting node. The Discovery Assistance Type subfield indicates the type of discovery assistance, whether it is through scheduled beamforming frame transmission or through triggered beamforming. This subfield represents a request if the subfield is in a request element and represents a response if the subfield is in a response element. When the subfield is set to triggered beamforming, the discovery assistance is performed through triggering the beamforming signal at a specified time (Beamforming Start TSF); this for example may be performed using beacon sweeping or TDD-beamforming. When the subfield is set to scheduled beamforming, the discovery assistance is scheduled in the attached extended schedule element. The Discovery Assistance Request status code subfield specifies the response of the discovery assistant request. The possible values of the Discovery Assistance Request status code subfield are indicated below, while other status codes may be defined to provide additional communication between the peer STAs.

The following illustrates an example of a discovery assistance state map.

Value 00: Reject a discovery assistant request on the band defined by the Band ID, operating class, channel number and BSSID, or other reason. The STA receiving this element will have to abort the discovery assistance procedure and optionally restart it again.

Value 01: Reject a discovery assistance request on the band defined by the Band ID, operating class, channel number and BSSID, unauthorized access, or other reasons. The STA receiving this element will have to abort the discovery assistance procedure and optionally restart it again.

Value 10: Accept a discovery assistance request on the band defined by the Band ID, operating class, channel number and BSSID. The STA receiving this information element shall process the information in the element and continue on the discovery assistance procedure, which includes transmitting or receiving beamforming frames or beacons.

Value 11: Reject discovery assistance feature in response to the band defined by the Band ID, operating class, channel number and BSSID, for the reason that a different BSS is suggested. The STA receiving this element will have to abort the discovery assistance procedure and optionally restart it again.

The Time Unit subfield in the figure indicates the time unit for the next beamforming frame exchange field. In an example time unit table value 0 indicates 1 µs, 1 indicates 100 µs, 2 indicates 400 µs and values 3-15 are presently reserved. The new STA uses these field values to know the time unit of the next beamforming frame.

The Beamforming Period subfield indicates the number of beacon intervals (BIs) or TDD slots following the Time to next beamforming frame during which the DMG Beacon frame or beamforming frames will not be present. The discovered STA transmits beacons or beamforming frames every Beamforming Period. The discovered STA might expect beamforming frames or Probe Request from the new STA every Beamforming Period.

The Fragmented TXSS subfield is set to a first state (e.g., 1) to indicate the TXSS is a fragmented sector sweep and is set to a second state (e.g., 0) to indicate that the TXSS is a complete sector sweep. This is to inform the STA that the beamforming or beacon sweep is spanning multiple beacon intervals in case of passive scanning.

The TXSS Span subfield indicates the number of beacon intervals it takes for the STA sending the DMG Beacon frame to complete the TXSS phase, and is always greater than or equal to 1. The new STA uses this information to more quickly decide on the end of the scanning process if no beamforming frame was received for the TXSS span period. Also this information can be utilized in some cases for making the beamforming process more efficient.

6.2. Extended Schedule Element

FIG. 20 illustrates an example embodiment 350 of an Extended Schedule element containing information about the allocations in the mmW band. The new STA uses this element to extract information about the allocations on the mmW band and if any station is allocated to it for discovery. The new STA can make a decision about joining or not joining the BSS based on the information in the extended schedule element. In at least one embodiment, the extended schedule information has a similar structure as the one defined in the 802.11 WLAN standards. The Extended Schedule element contains an element ID and length, along with any desired number of allocation fields which are defined below.

FIG. 21 illustrates an example embodiment 360 of the format of an allocation field as was seen in FIG. 20. Each allocation field contains the following fields in addition to other fields. An Allocation Control field is described below. A beamforming control field (BF Control) contains information about the type of beamforming training to carry in the allocated slot (Initiator TXSS or Responder TXSS) and the number of training sectors used for training from initiator and or responder and the total number of RX DMG antennas. The Source and Destination AID represent the ID for the source and Destination. If the source is the discovered STA and the destination is the new STA, the new STA performs passive discovery. If the source ID is the new STA and the destination ID is the discovered STA the new STA performs active discovery. The new STA can obtain a temporary AID from the BSS STA since the AID is not yet assigned to the station on the mmW band. Alternatively, the BSS STA can assign a reserved value of the AID to the new STA. In this case, AID value of 0 (which is reserved) is used for this transaction. The Allocation start time indicates the time at which the allocation starts. The Allocation Block Duration, the Number of Blocks and the Allocation Block Period indicate the allocation period and if it will repeat in the same BI after the Allocation Start. Other fields are used in the same context they are defined in the WLAN 802.11 standard.

FIG. 22 illustrates an example embodiment 370 of the bits within the Allocation Control subfield depicted in FIG. 21. In addition to other subfields, the Allocation ID is defined to indicate a unique ID for this allocation. The Allocation Type is set to the type of channel access whether this allocation is for CBAP, SP or TDD SP. The Pseudo-static subfield can be used to indicate that the allocation is static and that the allocation is valid for the length of the Discovery Assistance Window Length. The Truncatable subfield indicates whether the source DMG STA and destination DMG STA can request SP truncation for an SP allocation. The Extendable subfield indicates whether the source DMG STA and destination DMG STA can request SP extension for an SP allocation. The PCP Active subfield indicates whether the PCP is available to transmit or receive during the CBAP or SP when PCP is in active mode. The LP SC Used indicates if the low-power SC mode is used in this SP.

6.3. DMG Capability Element

The DMG capability element carries information about the DMG capabilities (mmW band capability) of the STA on the mmW band. In certain circumstances, the new STA and BSS STA can exchange their DMG capabilities with each other so as to become aware of each other's capabilities and optimize the discovery and beamforming process. The new STA can send the DMG capability information element to the BSS STA on the lower band where it can communicate with the BSS STA. The DMG capability information element can be sent with the FST Setup Request frame and indicates the DMG capabilities of the new STA on the mmW band. The BSS STA can send the DMG capability information element to the new STA on the lower band over which it can communicate with the new STA. The DMG capability information element can be sent with the FST Setup Response frame and indicates the DMG capabilities of the BSS STA on the mmW band.

FIG. 23 illustrates an example embodiment 380 of the DMG capabilities element having the following fields and can contain additional fields as desired. An Element ID and length identify the element and its size. A STA address contains the MAC address of the STA. An AID field contains the AID assigned to the STA by the AP or PCP, the new STA will have this field reserved. A DMG STA Capability Information subfield has subfields as shown below. The following fields are described in the WLAN 802.11 specification, and included herein only for convenience. The AP or PCP Capability information defines some capabilities of the PCP or the AP. The DMG STA Beam Tracking TimeLimit is used to set the value for the time limit for beamtracking. The Extended SC MCS Capabilities field advertises the support of the STA for some MCSs values. The Maximum number of basic A-MSDU subframes in A-MDSU indicates the maximum number of Basic A-MSDU subframes in an A-MSDU that the DMG STA is able to receive from another DMG STA. The Maximum number of short A-MSDU subframes in A-MDSU indicates the maximum number of Short A-MSDU subframes in an A-MSDU that the DMG STA is able to receive from another DMG STA.

FIG. 24 illustrates an example embodiment 390 of a directional multi-Gigabit (DMG) STA Capability Information subfield. It should be noted that the element is shown arbitrarily divided into sections merely for the sake of fitting the width of the drawing page, and that other fields may be included in the same context as defined in the WLAN 802.11 standard.

The following fields are described in the WLAN 802.11 specification, and included herein only for convenience. The Reverse Direction subfield (B0) indicates if the STA supports reverse direction transmission. The Higher Layer Timer Synchronization subfield (B1) indicates if the STA supports Higher Layer Timer Synchronization. The TPC subfield (B2) indicates if the STA supports transmit power control. The SPSH (spatial sharing) and Interference Mitigation subfield (B3) indicates if the STA is capable of performing the function of spatial sharing and Interference Mitigation. The Number of RX DMG Antennas subfield (B4 through B5) indicates the total number of receive DMG antennas of the STA. The Fast Link Adaptation subfield (B6) indicates if the STA supports the fast link adaptation procedure as defined in WLAN 802.11 standard, and included here only for convenience. The Total Number of Sectors subfield (B7 through B13) indicates the total number of transmit sectors the STA uses in a transmit sector sweep combined over all DMG antennas, including any LBIFS required for DMG antenna switching The value represented by the RXSS Length subfield (B14 through B19) specifies the total number of receive sectors combined over all receive DMG antennas of the STA, including any LBIFS required for DMG antenna switching. The DMG Antenna Reciprocity (B20) subfield is set to a first state (e.g., 1) to indicate that the best transmit DMG antenna of the STA is the same as the best receive DMG antenna of the STA and vice versa. Otherwise, this subfield is set to a second state (e.g., 0). The following fields are described in the WLAN 802.11 specification, and included herein only for convenience. The A-MPDU parameters (B21 through B26) define the parameters for the A-MPDU. The BA with Flow Control (B27) indicates if the STA supports block ACK with flow control. The supported MCS set (B28 through B51) indicates which MCSs a STA supports. The DTP supported subfield (B52) indicates if the STA supports dynamic tone pairing. The A-PPDU Supported subfield (B53) indicates if the STA supports A-PPDU aggregation. The Supports Other AID subfield (B55) indicates how the STA sets its AWV configuration. The Antenna Pattern Reciprocity subfield (B56) is set to 1 to indicate that the transmit antenna pattern associated with an AWV is the same as the receive antenna pattern for the same AWV; otherwise this subfield is set to 0.

The following fields are described in the WLAN 802.11 specification, and included herein only for convenience. The Heartbeat Elapsed Indication subfield (B57 through B59) indicates if the STA expects to receive a heartbeat frame. The Grant ACK supported subfield (B60) indicates if the STA is capable of responding to a Grant frame with a Grant ACK frame. The RXSS TxR ATE Supported subfield (B61) indicates if the STA can perform an RXSS with SSW frames transmitted at MCS 1 of the DMG SC modulation class. Currently there are Reserved fields (B61 through B62).

To the above has been added a discovery assistance supported subfield (B62) according to the present disclosure to indicate if the STA supports discovery assistance. The Discovery Assistance Supported subfield is set to a first state (e.g., 1) to indicate that the STA supports discovery assistance and to a second state (e.g., 0) to indicate otherwise. If this field is set to 1, the STA should respond to discovery assistance requests whenever it receives ones. Also the STA is capable of providing discovery assistance to STAs requesting it and propagating the request if necessary to other STAs. Other fields are used in the same context as they are defined in WLAN 802.11 standard. One reserved bit remains (B63).

6.4. Information Request Frame Format

FIG. 25 illustrates an example embodiment 400 of an FST information Request frame having the following fields. The Category field and DMG Action field define the type of the frame. The Subject Address field contains the MAC address of the STA whose information is being requested. If this frame is sent to the PCP and the value of the Subject Address field is the broadcast address, then the STA is requesting information regarding all associated STAs. The Request element field contains IDs of elements request to be transmitted. The DMG Capabilities element carries information about the transmitter STA and other STAs known to the transmitter STA. The zero or more provided elements are elements that the transmitter of this frame is providing to the destination of the frame, for example discovery assistance element. The Extended Request element are elements IDs requested to be transmitted to the STA.

6.5. Information Response Frame Format

FIG. 26 illustrates an example embodiment 410 of an FST information Response frame having the following fields. The Category field and DMG Action field define the type of the frame. The Subject Address field contains the MAC address of the STA whose information is being provided. If this field is set to the broadcast address, then the STA is providing information regarding all associated STAs. The Request element field contains IDs of elements request to be transmitted. The DMG Capabilities element carries information about the transmitter STA and other STAs known to the transmitter STA. The requested elements are those returned in response to an Information Request frame. The Zero or more provided elements are element that the transmitter of this frame provides to the destination of the frame, either in addition to the requested elements, or in an unsolicited Information Response frame, for example discovery assistance element.

7. Discovery Assistance Implementation Examples 7.1. Topology Examples

Figure 27:
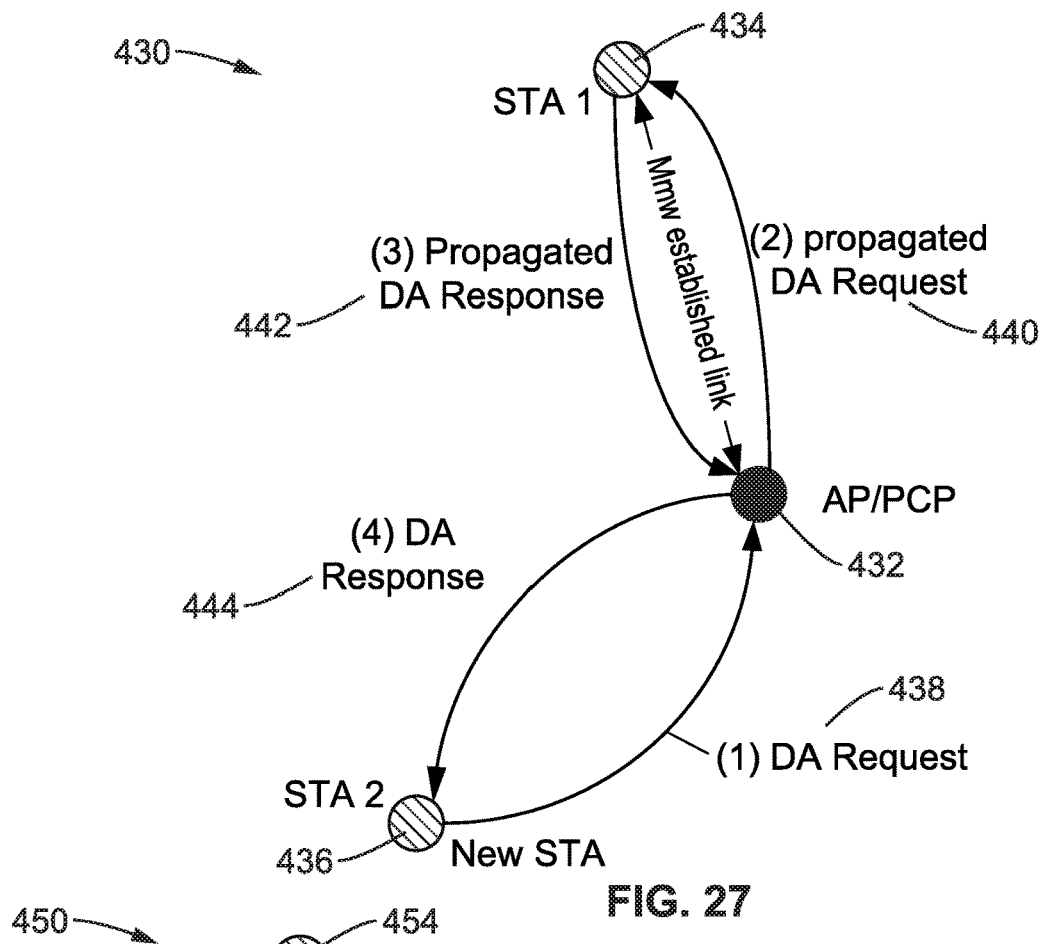
FIG. 27 is a signaling and directional beam diagram of a first discovery assistance request and response example according to an embodiment of the present disclosure.
Figure 28:
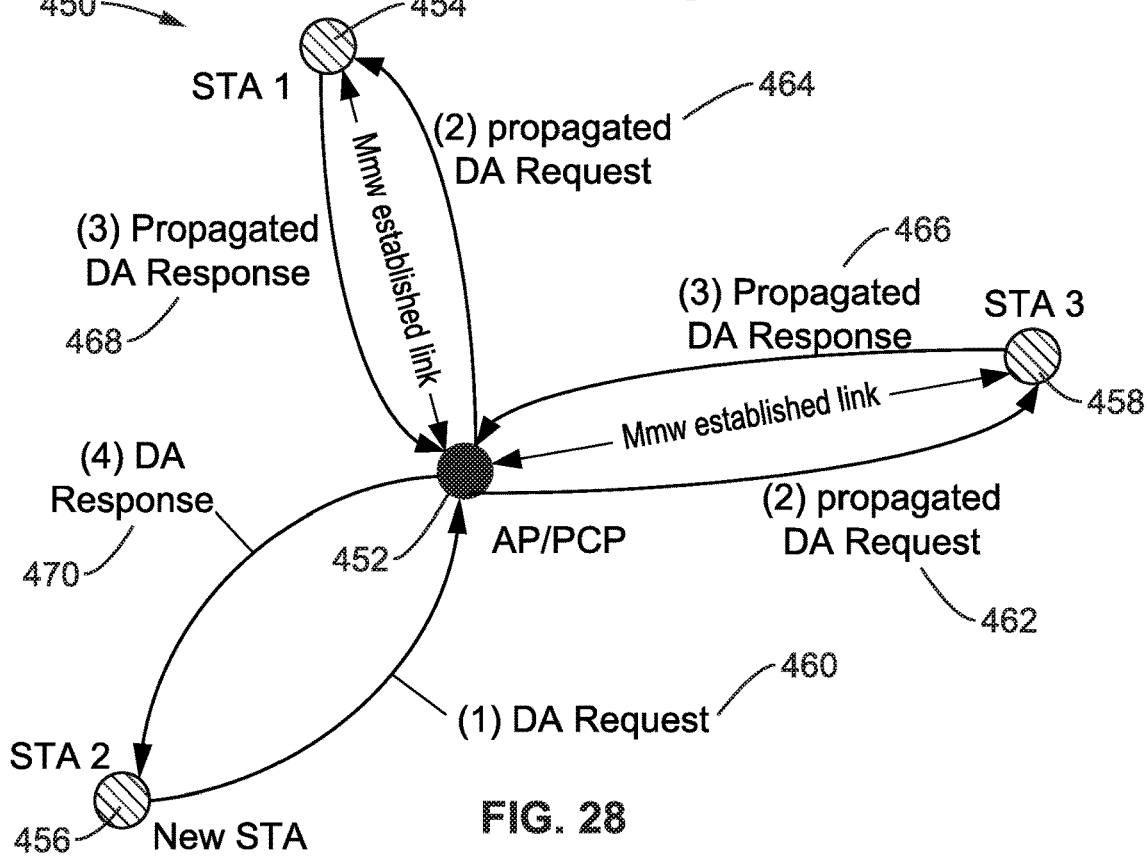
FIG. 28 is a signaling and directional beam diagram of a second discovery assistance request and response example according to an embodiment of the present disclosure.
Figure 29:
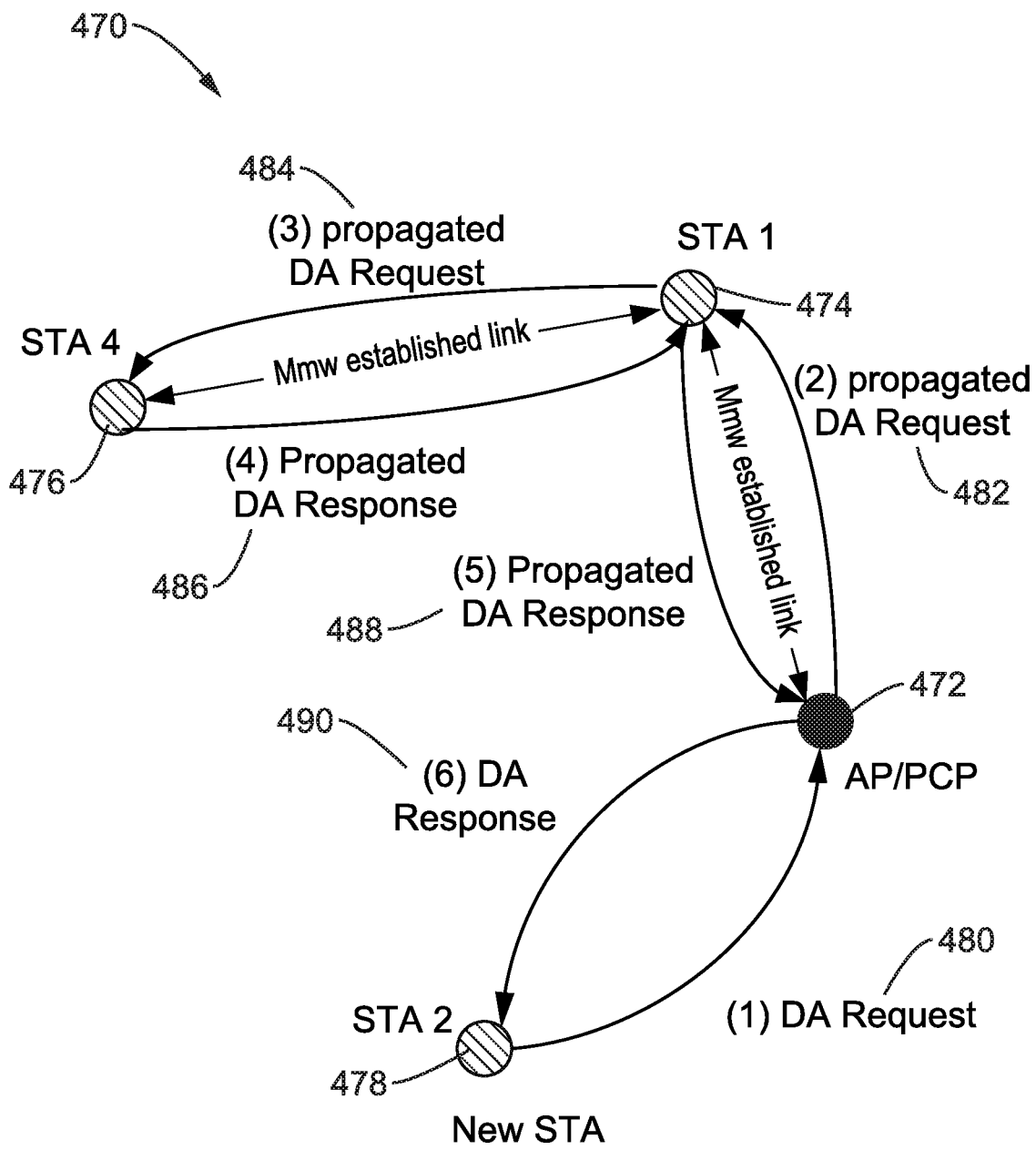
FIG. 29 is a signaling and directional beam diagram of a third discovery assistance request and response example according to an embodiment of the present disclosure.

FIG. 27 through FIG. 29 illustrate example embodiments 430, 450 470 of propagating discovery assistance to STAs in the BSS of an AP/PCP that received a discovery assistance request from a new STA trying to discovery neighboring STAs.

7.1.1. Discovery Assistance Request and Response

In FIG. 27 is shown AP/PCP 432 communicating with STA 1 434 through an mmW established link. STA 2 436 is a new STA trying to discovery neighboring nodes.

STA2 can also be a STA connected to the AP and trying to discover new neighboring STAs. STA 2 sends the AP/PCP a discovery assistance (DA) request and waits for a discovery assistance response from the AP/PCP. In at least one embodiment, the frames exchanged between STA 2 and the AP/PCP are as follows. (a) Frames are exchanged using lower band signaling. STA 2 and the AP/PCP are connected through lower band and the frames are exchanged on lower bands. The AP, and depending on circumstances other STAs, are requested to offer discovery assistance to the STA. STAs are sending and receiving the discovery assistance request and response frames on the lower band. STA 2 can use the FST Setup Request and FST Setup Response frames with the discovery assistance element to signal the discovery assistance request and response. (b) Frames are exchanged using mmW band signaling in two different ways. (b)(1) STA 2 and the AP/PCP are connected through mmW band: STA 2 sends a discovery assistance request to the AP/PCP to request a discovery assistance campaign to help STA 2 discovery new neighboring STAs. AP/PCP receive the request, propagate it to other STAs and sends STA 2 the response. AP might or might not participate in the discovery campaign since it is already connected to STA 2. STA 2 can use the Information Request and information Response frames with the discovery assistance element to signal the discovery assistance request and response. (b)(2) STA 2 and the AP/PCP are not connected through mmW band: STA 2 broadcasts a discovery assistance request by sending the discovery assistance request in all directions. The AP/PCP receives the request and might propagate the request to other STAs in the surrounding area or in its BSS. The AP/PCP sends STA 2 the response back by broadcasting the response in all directions. STA 2 can use the Information Request and information Response frames with the discovery assistance element to signal the discovery assistance request and response.

The discovery assistance request from STA 2 to the AP/PCP can contain other elements like the DMG capabilities element, multi-band element or any other capabilities and operations element to inform the STA Receiving the request with the STA capabilities.

The discovery assistance response from the AP/STA can contain other elements like the extended schedule element, TDD slot structure, TDD slot schedule, DMG capabilities element or any other capabilities and operations elements to inform STA2 about the nature of the discovery campaign and the capabilities of the STAs offering it.

7.1.2. Propagated Discovery Assistance Request and Response

Upon reception of a discovery assistance request the DMG AP or PCP may send a DMG discovery assistance request to other DMG STAs in its BSS to assist a DMG STA requesting discovery assistance discovering neighbor STAs in the BSS. The DMG discovery assistance request is an Information request frame containing the DMG Discovery Assistance element and the DMG Capabilities element of the STA requesting the discovery assistance. The Information Request frame carries no other DMG Capabilities element in case of DMG discovery assistance request.

A DMG STA receiving the DMG discovery assistance request shall respond with DMG discovery assistance response, such as an Information Response frame containing the DMG Discovery Assistance element if the STA supports the discovery assistance feature. If the DMG STA accepted the discovery assistance request and sent back a DMG discovery assistance response to the DMG AP or PCP, it shall start on-demand sector sweeping as specified in the DMG discovery assistance response that it transmitted or within a scheduled allocation.

After transmitting a DMG discovery assistance request, the DMG AP or PCP waits for a DMG discovery assistance response over wait time X. After the timer expiration, or reception of the DMG discovery assistance, that station determines what is the discovery assistance offered to the STA requesting the discovery assistance.

In FIG. 27 an example is shown 430 of STA 2 436 sending a DA request 438 to AP/PCP 432. Upon reception of the DA request the AP/PCP propagates the DA request sending a DA request 440 to STA 1 434 to request STA 1 discovery assistance towards STA 2 with DMG capabilities of STA 2. STA 1 responds with Discovery assistance response 442 if it supports discovery assistance. If the request is accepted, STA 1 sends information about the discovery assistance provided to STA 2 within the response 442. AP/PCP receives the response, processes the discovery assistance information from STA 1 with its own offered discovery assistance to STA 1 and sends a DA response 444 to STA 1.

In FIG. 28 an example is shown 450 of new STA 2 456 sending a DA request 460 to the AP/PCP 452. Upon reception of the DA request the AP/PCP propagates the DA request sending DA requests 462, 464 to STA 1 454 and STA 3 458 to request discovery assistance towards STA 2 with the DMG capabilities of STA 2. STA 1 responds with Discovery assistance response 468 if it supports discovery assistance and STA 3 responds with Discovery assistance response 466 if it supports discovery assistance. If the requests are accepted, STA 1 and STA 3 send information about the discovery assistance provided to STA 2 within these responses 466, 468. The AP/PCP receives the responses, processes the discovery assistance information from STA 1 and STA 3 with its own offered discovery assistance to STA 2 and sends a DA response 470 to STA 2.

In FIG. 29 an example 470 is shown of a new STA 2 478 sending a DA request 480 to the AP/PCP 472. Upon reception of DA request 480 the AP/PCP propagates the DA request, sending a DA request 482 to STA 1 474 to request STA1 discovery assistance towards STA 2 according to the DMG capabilities of STA 2. STA 1 receives the propagated DA request and decides to propagate it to STA 4. STA 1 sends a DA request 484 to STA 4 476 containing the DMG capabilities of STA 2. STA 4 responds to the STA 2 request by sending discovery assistance response 486 to STA 2 if it supports discovery assistance. If the request is accepted, STA 4 sends information about the discovery assistance provided to STA 2 within the response 486 to STA 1. STA 1 receives the response from STA 4 and processes the response with its own anticipated response. If STA 1 is offering discovery assistance to STA 2, in view of an accepted request, then STA 1 combines discovery assistance response from STA 4 with its own prepared response to the request and sends a response 488 to the AP/PCP 472. In this response 488 STA 1 has sent information about the discovery assistance to be provided to STA 2 by STA 1 and STA 4. AP/PCP 472 receives the response, processes the discovery assistance information from STA 1 with its own offered discovery assistance to STA 1 and sends a DA response 490 to STA 1.

In the previous example STA 4 can be in the same BSS of STA 1 and the AP, or it can be in a different BSS. An example where STA 4 is part of a different BSS is when STA 1 has multiple MAC where one is part of the AP/PCP BSS and the other MAC is forming another BSS with STA 4.

7.1.3. Discovery Assistance Propagation Frames

Information request and information response frames can be used to send propagated discovery assistance request and response, respectively. In order to do so, the information request frame and information response frame carries the discovery assistance element to indicate the various fields of information for the request or response.

When a DMG AP or PCP sends DMG discovery assistance request to STAs in its BSS, it decides on the type of discovery assistance offered and sets fields in the DMG Discovery Assistance element in the Information Request frame as follows:

If the discovery assistance is performed through sector sweeping, then the Discovery Assistance Type subfield in the Discovery Assistance Control field is set to a first state (e.g., 0).

If the discovery assistance is performed through scheduled beamforming allocation, then the Discovery Assistance Type subfield in the Discovery Assistance Control field is set to a second state (e.g., 1); and the Temporary AID field is set to the temporary AID assigned by the DMG AP or PCP to the DMG STA requesting discovery assistance relating to Discovery assistance action determination and on-demand sector sweeping.

Upon receiving the Information Request frame containing the DMG Discovery Assistance element and the DMG Capabilities element, a DMG STA that supports discovery assistance determines if it will accept the discovery assistance request. Further, it shall respond with an Information Response frame with a DMG Discovery Assistance element to the DMG AP or PCP. If the discovery assistance request is accepted, the Discovery Assistance Request Status Code field in the DMG Discovery Assistance element in the Information Response frame is set to ACCEPTED (SUCCESS). The field is set to REJECTED (REFUSED) otherwise. According to at least one embodiment, when accepting the discovery assistance request, the DMG STA takes one of the following actions.

If the discovery assistance is requested through sector sweeping then the following actions are performed. The DMG STA uses the DMG Capabilities element of the DMG STA requesting discovery assistance contained in the Information Request frame to calculate the Discovery Assistance Window Length and to schedule sector sweeping. The antenna configuration (number of TX and RX sectors and number of DMG antennas) are used to determine the required time to sweep all sectors across one or more beacon intervals. For example, the number of transmit antenna sectors in the STA requesting discovery assistance is used to determine the exact number of slots needed in the A-BFT period for the responder TXSS. The DMG STA can use multiple beacon intervals to complete full DMG Beacon sweeping. The Discovery Assistance Window Length might include one or more complete full DMG Beacon Sweeps. The DMG Discovery Assistance element fields in the Information Response frame are set as follows: (a) Sets the Discovery Assistance Type subfield in the Discovery Assistance Control field to a first state (e.g., 0); and (b) Sets the Dwelling Time Present subfield in the Discovery Assistance Control field to a first state (e.g., 0); and (c) Sets the Discovery Assistance Window Length field to the discovery assistance window length value; and (d) Sets the Sector Sweep Start Time field to the TSF value indicating when the discovery assistance starts. The DMG STA shall start sector sweeping at the Sector Sweep Start Time for a duration of time equal to Discovery Assistance Window Length.

If the discovery assistance is requested through scheduled beamforming allocation then the following actions are performed. The DMG STA uses the DMG Capabilities element of the DMG STA requesting discovery assistance contained in the Information Request frame to determine the Discovery Assistance Window Length as the total time needed to complete beamforming training including at least time to cover the initiator TXSS and the responder TXSS. The DMG Discovery Assistance element fields in the Information Response frame are set as follows: (a) Sets the Discovery Assistance Type subfield in the Discovery Assistance Control field to a second state (e.g., 1); and (b) Sets the Dwelling Time Present subfield in the Discovery Assistance Control field to 0; and (c) Sets the Discovery Assistance Window Length field to the discovery assistance window length value, in microseconds; and (d) Sets the Temporary AID field to the temporary AID assigned by the DMG AP or PCP to the DMG STA requesting discovery assistance. The DMG STA should receive an Extended Schedule element with allocation information for the beamforming training with the STA requesting discovery assistance.

Upon receiving the Information Response frame indicating ACCEPT (SUCCESS) in the Discovery Assistance Request Status Code field in the DMG Discovery Assistance element, the DMG AP or PCP processes all received DMG Discovery Assistance elements through Information Response frames. The DMG AP or PCP sends the DMG STA requesting Discovery Assistance a DMG Discovery Assistance element with discovery assistance information that includes the discovery assistance from the AP/PCP and any other STA where the request is propagated and accepted.

7.1.4. Processing Propagated Discovery Assistance Responses

After transmitting a DMG discovery assistance request, the DMG AP or PCP wait for a DMG discovery assistance response for wait time X. After the timer expiration or reception of the DMG discovery assistance, the DMG AP or PCP determine the discovery assistance offered to the STA requesting the discovery assistance and send the STA requesting discovery assistance the response.

If more than one STA, including or excluding the DMG AP or PCP, are providing discovery assistance and the discovery assistance is performed through scheduled beamforming allocation, the AP or PCP schedules beamforming training periods between the DMG STA requesting discovery assistance and DMG STAs offering discovery assistance. The DMG Extended Schedule element is sent to all DMG STAs offering discovery assistance, for example through sending an announcement frame or beacon frame containing the DMG Extended Schedule element, and the DMG STA requesting discovery assistance. The Destination AID subfield in the Allocation field in the DMG Extended Schedule element is set to the DMG STA offering discovery assistance AID in case of active scanning and the Source AID subfield in the Allocation field is set to the DMG STA offering discovery assistance AID in case of passive scanning.

After determining discovery assistance actions, the DMG AP or PCP sends the discovery assistance response to the DMG STA requesting discovery assistance. If more than one STA including or excluding the DMG AP or PCP are providing discovery assistance, the DMG AP or PCP sets the Discovery Assistance Request Status Code field in the DMG Discovery Assistance element sent to the STA requesting discovery assistance to ACCEPT (SUCCESS). The DMG AP or PCP sets the DMG Discovery Assistance element according to its offered discovery assistance parameters and updates the following fields.

If discovery assistance is performed through sector sweeping, then the Discovery Assistance Window Length is set to the time duration after Sector Sweep Start Time until all STAs offering discovery assistance complete their discovery assistance; and the Sector Sweep Start Time field is set to the earliest start time value among STAs offering discovery assistance and the time when the first DMG STA offering discovery assistance starts discovery assistance.

If discovery assistance is performed through scheduled beamforming allocation, then the Discovery Assistance Window Length is set to the time duration of the all STAs beamforming periods starting from the first allocation, including all time blocks if more than one time block is scheduled.

The DMG AP or PCP and other STAs offering discovery assistance start on-demand sector sweeping or beamforming period training at the scheduled time.

8. Summary of Disclosure Elements

The following summary discloses certain important elements of the instant disclosure, however the summary is not to be construed as describing the only important elements of the disclosure.

Upon receiving a discovery assistance request from a STA requesting discovery assistance, a BSS STA supporting discovery assistance propagates the discovery assistance request to its neighboring STA by sending a discovery assistance request to its neighboring STAs. STAs receiving this request are configured to reply with a discovery assistance response if they support discovery assistance and offer discovery assistance to the STA requesting discovery assistance if the request is accepted. The STA that propagate the DA request is configured to send the following information in a discovery assistance element to the neighbor STAs when a discovery assistance request is sent: (a) The type of discovery assistance to be offered to the STA requesting discovery assistance which can be: (a)(1) on-demand sector sweeping starting at specific time; (a)(2) allocated beamforming training period between the STA requesting discovery assistance and the STA offering discovery assistance; (b) the temporary AID of the STA requesting discovery assistance; (c) the DMG capabilities of the STA requesting discovery assistance.

The STAs receiving the propagated DA request is configured to reply with a discovery assistance response including the following information: (a) if type of discovery assistance is on-demand sector sweeping, then sending time to start sector sweeping and discovery assistance window length; (b) If type of discovery assistance is Allocated beamforming training period, then sending the time needed to perform beamforming with the STA requesting DA.

An information request frame can carry the discovery assistance element propagated to neighbor STAs with the DMG capability element of the STA requesting DA to represent a discovery assistance request. An information response frame can carry the discovery assistance element propagated to neighbor STAs representing a discovery assistance response.

If the discovery assistance type is an allocated beamforming training period, then an allocated beamforming training period schedules all beamforming training periods between the STA requesting discovery assistance and all STAs that accepted the discovery assistance request. The extended schedule element with allocation information should be sent to all STAs participating in the discovery campaign.

A BSS STA that received a discovery assistance request from a STA requesting discovery assistance, processes all received discovery assistance responses from neighbor STAs in response to the propagated discovery assistance request sent to a neighbor STA and sends one discovery assistance response to the STA requesting discovery assistance. The discovery assistance response to the STA requesting discovery assistance should contain the discovery campaign information.

A STA accepting the propagated discovery assistance request is configured to perform on-demand sector sweeping or beamforming training at the time that was indicated in the discovery assistance response or received in the extended schedule element from the STA sending the propagated discovery assistance request.

9. General Scope of Embodiments

The enhancements described in the presented technology can be readily implemented within the protocols (e.g., programming executing on the processor of the station) of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, comprising: (a) a wireless communication circuit configured as a station for wirelessly communicating with at least one other station, using directional communications; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) performing directional communications with one or more other stations on the wireless network over directional antenna sectors selected from a plurality of directional antenna sectors; (d)(ii) receiving a discovery assistance request from a first neighboring station which is seeking discovery assistance in discovering stations on the wireless network; (d)(iii) propagating the received discovery assistance request to one or more neighboring stations in its BSS or outside its BSS, aside from said first neighboring station; (d)(iv) receiving discovery assistance responses from said one or more neighboring stations which support discovery assistance and have replied with a discovery assistance response as they support discovery assistance and are offering discovery assistance; (d)(v) determining a discovery assistance response comprising information obtained from this station itself and from stations offering discovery assistance within a discovery information frame; (d)(vi) wherein said discovery assistance response comprises information about type of discovery assistance along with associated scheduling and time information; and (d)(vii) sending said discovery assistance response, with an information response frame carrying a discovery assistance element, to the first neighboring station which is seeking discovery assistance.

2. A method of performing wireless communication in a network, comprising: (a) performing directional communications from a wireless communication circuit configured as a station for wirelessly communicating with at least one other station using directional communications on the wireless network over directional antenna sectors selected from a plurality of directional antenna sectors; (b) receiving a discovery assistance request from a first neighboring station which is seeking discovery assistance in discovering stations on the wireless network; (c) propagating the received discovery assistance request to one or more neighboring stations in its BSS or outside its BSS, aside from said first neighboring station; (d) receiving discovery assistance responses from said one or more neighboring stations which support discovery assistance and have replied with a discovery assistance response as they support discovery assistance and are offering discovery assistance; (e) determining a discovery assistance response comprising information obtained from this station itself and from stations offering discovery assistance within a discovery information frame; (f) wherein said discovery assistance response comprises information about type of discovery assistance along with associated scheduling and time information; and (g) sending said discovery assistance response, with an information response frame carrying a discovery assistance element, to the first neighboring station which is seeking discovery assistance.

3. The apparatus or method of any preceding embodiment, wherein said instructions when executed by the processor which accepts a propagated discovery assistance request by performing on-demand sector sweeping or beamforming training at a time as indicated in its discovery assistance response or received in an extended schedule element from a station sending the propagated discovery assistance request.

4. The apparatus or method of any preceding embodiment, wherein type of said discovery assistance is either (a) on-demand sector sweeping starting at a specific time, or (b) an allocated beamforming training period between the station requesting discovery assistance and the station offering discovery assistance.

5. The apparatus or method of any preceding embodiment, wherein said instructions when executed by the processor perform said discovery assistance by further incorporating a temporary association identification (AID) of said first neighboring station which is seeking discovery assistance, and directional multi-gigabit DMG capabilities of the station requesting discovery assistance.

6. The apparatus or method of any preceding embodiment, wherein said instructions when executed by the processor perform said allocated beamforming training period which comprises scheduling all beamforming training periods between the station requesting discovery assistance and all stations that accepted the discovery assistance request.

7. The apparatus or method of any preceding embodiment, wherein said instructions when executed by the processor performing said allocated beamforming training period and incorporating an extended schedule element with allocation information sent to all stations participating in a discovery campaign to aid said first neighboring station seeking discovery assistance.

8. The apparatus or method of any preceding embodiment, wherein said instructions when executed by the processor perform operations of a station receiving a propagated discovery assistance (DA) request to which it replies with a discovery assistance response comprising either: (a) sending time to start sector sweeping and discovery assistance window length, if type of discovery assistance is using on-demand sector sweeping; or (b) sending time needed to perform beamforming with the station requesting discovery assistance (DA), if type of discovery assistance using allocated beamforming training period.

9. The apparatus or method of any preceding embodiment, wherein said instructions when executed by the processor perform sending an information request frame which carries a discovery assistance element propagated to neighbor stations, with said information request frame containing a directional multi-Gigabit (DMG) capability element of the station requesting discovery assistance.

10. The apparatus or method of any preceding embodiment, wherein said station comprises an extended directional multi-gigabyte personal basic service set control point (PCP), or an access point (AP) that enables the distributed scheduling protocol and advertises it by setting a distributed scheduling enabled field in a transmitted extended directional multi-gigabit (EDMG) extended schedule element.

11. The apparatus or method of any preceding embodiment, wherein said apparatus is applicable to network applications selected from the group of network types and applications consisting of: device-to-device (D2D), peer-to-peer (P2P), wireless and mesh networking applications, wireless personal area networks (WPAN), outdoor wireless communications, Wi-Fi, WiGig, Internet of things (IoT) applications, backhauling of data, fronthauling of data, indoor and outdoor distribution networks, mesh networks, a next generation of cellular networks, and a next generation of cellular networks with D2D communications.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
    (a) a wireless communication circuit configured as a station for wirelessly communicating with at least one other station, using directional communications;
    (b) a processor coupled to said wireless communication circuit within a station configured for operating on a wireless network;
    (c) a non-transitory memory storing instructions executable by the processor; and
    (d) wherein said instructions, when executed by the processor, perform steps comprising:
        (i) performing directional communications with one or more other stations on the wireless network over directional antenna sectors selected from a plurality of directional antenna sectors;
        (ii) receiving a discovery assistance request from a first neighboring station which is seeking discovery assistance in discovering stations on the wireless network;
        (iii) propagating the received discovery assistance request to one or more neighboring stations in its BSS or outside its BSS, aside from said first neighboring station;
        (iv) receiving discovery assistance responses from said one or more neighboring stations which support discovery assistance and have replied with a discovery assistance response as they support discovery assistance and are offering discovery assistance;
        (v) determining a discovery assistance response comprising information obtained from this station itself and from stations offering discovery assistance within a discovery information frame;
        (vi) wherein said discovery assistance response comprises information about type of discovery assistance along with associated scheduling and time information; and
        (vii) sending said discovery assistance response, with an information response frame carrying a discovery assistance element, to the first neighboring station which is seeking discovery assistance.

2. The apparatus of claim 1, wherein said instructions when executed by the processor which accepts a propagated discovery assistance request by performing on-demand sector sweeping or beamforming training at a time as indicated in its discovery assistance response or received in an extended schedule element from a station sending the propagated discovery assistance request.

3. The apparatus of claim 1, wherein type of said discovery assistance is either (a) on-demand sector sweeping starting at a specific time, or (b) an allocated beamforming training period between the station requesting discovery assistance and the station offering discovery assistance.

4. The apparatus of claim 3, wherein said instructions when executed by the processor perform said discovery assistance by further incorporating a temporary association identification (AID) of said first neighboring station which is seeking discovery assistance, and directional multi-gigabit DMG capabilities of the station requesting discovery assistance.

5. The apparatus of claim 3, wherein said instructions when executed by the processor perform said allocated beamforming training period which comprises scheduling all beamforming training periods between the station requesting discovery assistance and all stations that accepted the discovery assistance request.

6. The apparatus of claim 5, wherein said instructions when executed by the processor performing said allocated beamforming training period and incorporating an extended schedule element with allocation information sent to all stations participating in a discovery campaign to aid said first neighboring station seeking discovery assistance.

7. The apparatus of claim 1, wherein said instructions when executed by the processor perform operations of a station receiving a propagated discovery assistance (DA) request to which it replies with a discovery assistance response comprising either:
  (a) sending time to start sector sweeping and discovery assistance window length, if type of discovery assistance is using on-demand sector sweeping; or
  (b) sending time needed to perform beamforming with the station requesting discovery assistance (DA), if type of discovery assistance using allocated beamforming training period.

8. The apparatus of claim 1, wherein said instructions when executed by the processor perform sending an information request frame which carries a discovery assistance element propagated to neighbor stations, with said information request frame containing a directional multi-Gigabit (DMG) capability element of the station requesting discovery assistance.

9. The apparatus of claim 1, wherein said station comprises an extended directional multi-gigabyte personal basic service set control point (PCP), or an access point (AP) that enables the distributed scheduling protocol and advertises it by setting a distributed scheduling enabled field in a transmitted extended directional multi-gigabit (EDMG) extended schedule element.

10. The apparatus of claim 1, wherein said apparatus is applicable to network applications selected from the group of network types and applications consisting of: device-to-device (D2D), peer-to-peer (P2P), wireless and mesh networking applications, wireless personal area networks (WPAN), outdoor wireless communications, Wi-Fi, WiGig, Internet of things (IoT) applications, backhauling of data, fronthauling of data, indoor and outdoor distribution networks, mesh networks, a next generation of cellular networks, and a next generation of cellular networks with D2D communications.

11. An apparatus for wireless communication in a network, comprising:
  (a) a wireless communication circuit configured as a station for wirelessly communicating with at least one other station, using directional communications;
  (b) a processor coupled to said wireless communication circuit within a station configured for operating on a wireless network;
  (c) a non-transitory memory storing instructions executable by the processor; and
  (d) wherein said instructions, when executed by the processor, perform steps comprising:
    (i) performing directional communications with one or more other stations on the wireless network over directional antenna sectors selected from a plurality of directional antenna sectors;
    (ii) receiving a discovery assistance request from a first neighboring station which is seeking discovery assistance in discovering stations on the wireless network;
    (iii) propagating the received discovery assistance request to one or more neighboring stations in its BSS or outside its BSS, aside from said first neighboring station;
    (iv) receiving discovery assistance responses from said one or more neighboring stations which support discovery assistance and have replied with a discovery assistance response as they support discovery assistance and are offering discovery assistance;
    (v) determining a discovery assistance response comprising information obtained from this station itself and from stations offering discovery assistance within a discovery information frame;
    (vi) wherein said discovery assistance response comprises information about type of discovery assistance along with associated scheduling and time information;
    (vii) wherein type of said discovery assistance is either (a) on-demand sector sweeping starting at a specific time, or (b) an allocated beamforming training period between the station requesting discovery assistance and the station offering discovery assistance; and
    (viii) sending said discovery assistance response, with an information response frame carrying a discovery assistance element, to the first neighboring station which is seeking discovery assistance.

12. The apparatus of claim 11, wherein said instructions when executed by the processor which accepts a propagated discovery assistance request by performing on-demand sector sweeping or beamforming training at a time as indicated in its discovery assistance response or received in an extended schedule element from a station sending the propagated discovery assistance request.

13. The apparatus of claim 12, wherein said instructions when executed by the processor perform said discovery assistance by further incorporating a temporary association identification (AID) of said first neighboring station which is seeking discovery assistance, and directional multi-gigabit DMG capabilities of the station requesting discovery assistance.

14. The apparatus of claim 12, wherein said instructions when executed by the processor perform said allocated beamforming training period which comprises scheduling all beamforming training periods between the station requesting discovery assistance and all stations that accepted the discovery assistance request.

15. The apparatus of claim 14, wherein said instructions when executed by the processor performing said allocated beamforming training period and incorporating an extended schedule element with allocation information sent to all stations participating in a discovery campaign to aid said first neighboring station seeking discovery assistance.

16. The apparatus of claim 11, wherein said instructions when executed by the processor perform operations of a station receiving a propagated discovery assistance (DA) request to which it replies with a discovery assistance response comprising either:
  (a) sending time to start sector sweeping and discovery assistance window length, if type of discovery assistance is using on-demand sector sweeping; or
  (b) sending time needed to perform beamforming with the station requesting discovery assistance (DA), if type of discovery assistance using allocated beamforming training period.

17. The apparatus of claim 11, wherein said instructions when executed by the processor perform sending an information request frame which carries a discovery assistance element propagated to neighbor stations, with said information request frame containing a directional multi-Gigabit (DMG) capability element of the station requesting discovery assistance.

18. The apparatus of claim 11, wherein said station comprises an extended directional multi-gigabyte personal basic service set control point (PCP), or an access point (AP) that enables the distributed scheduling protocol and advertises it by setting a distributed scheduling enabled field in a transmitted extended directional multi-gigabit (EDMG) extended schedule element.

19. The apparatus of claim 11, wherein said apparatus is applicable to network applications selected from the group of network types and applications consisting of: device-to-device (D2D), peer-to-peer (P2P), wireless and mesh networking applications, wireless personal area networks (WPAN), outdoor wireless communications, Wi-Fi, WiGig, Internet of things (IoT) applications, backhauling of data, fronthauling of data, indoor and outdoor distribution networks, mesh networks, a next generation of cellular networks, and a next generation of cellular networks with D2D communications.

20. A method of performing wireless communication in a network, comprising:
  (a) performing directional communications from a wireless communication circuit configured as a station for wirelessly communicating with at least one other station using directional communications on the wireless network over directional antenna sectors selected from a plurality of directional antenna sectors;
  (b) receiving a discovery assistance request from a first neighboring station which is seeking discovery assistance in discovering stations on the wireless network;
  (c) propagating the received discovery assistance request to one or more neighboring stations in its BSS or outside its BSS, aside from said first neighboring station;
  (d) receiving discovery assistance responses from said one or more neighboring stations which support discovery assistance and have replied with a discovery assistance response as they support discovery assistance and are offering discovery assistance;
  (e) determining a discovery assistance response comprising information obtained from this station itself and from stations offering discovery assistance within a discovery information frame;
  (f) wherein said discovery assistance response comprises information about type of discovery assistance along with associated scheduling and time information; and
  (g) sending said discovery assistance response, with an information response frame carrying a discovery assistance element, to the first neighboring station which is seeking discovery assistance.

* * * * *